US012570096B2

(12) United States Patent
Arizono et al.

(10) Patent No.: US 12,570,096 B2
(45) Date of Patent: Mar. 10, 2026

(54) PRINTING APPARATUS, POSITION ADJUSTMENT METHOD, AND NON-TRANSITORY COMPUTER-READABLE RECORDING MEDIUM RECORDING POSITION ADJUSTMENT PROGRAM

(71) Applicant: SCREEN Holdings Co., Ltd., Kyoto (JP)

(72) Inventors: Shigenori Arizono, Kyoto (JP); Yuya Takagi, Kyoto (JP); Muneaki Kitaoji, Kyoto (JP); Kenichi Yokouchi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 222 days.

(21) Appl. No.: 18/615,665

(22) Filed: Mar. 25, 2024

(65) Prior Publication Data

US 2024/0326476 A1     Oct. 3, 2024

(30) Foreign Application Priority Data

Mar. 28, 2023     (JP) ................................. 2023-050871

(51) Int. Cl.
| | |
|---|---|
| *B41J 11/00* | (2006.01) |
| *B41J 2/21* | (2006.01) |
| *G06K 15/02* | (2006.01) |
| *G06K 15/10* | (2006.01) |
| *G06T 7/70* | (2017.01) |
| *H04N 1/60* | (2006.01) |

(52) U.S. Cl.
CPC ......... *B41J 11/0095* (2013.01); *B41J 2/2135* (2013.01); *B41J 11/002* (2013.01); *B41J 11/008* (2013.01); *G06K 15/027* (2013.01); *G06K 15/102* (2013.01); *G06T 7/70* (2017.01); *G06K 2215/101* (2013.01)

(58) Field of Classification Search
CPC ..... B41J 11/0095; B41J 11/002; B41J 11/008; B41J 29/393; B41J 2/2135; H04N 1/6033; G06T 7/70; G06K 15/027; G06K 15/102; G06K 2215/101
See application file for complete search history.

(56) References Cited

U.S. PATENT DOCUMENTS

| | | | |
|---|---|---|---|
| 2011/0199410 A1* | 8/2011 | Mase | B41J 2/165 347/14 |
| 2016/0031208 A1* | 2/2016 | Kobayashi | B41J 19/147 347/14 |
| 2018/0097973 A1* | 4/2018 | Yoshizawa | G01J 3/462 |
| 2018/0198958 A1* | 7/2018 | Yoshida | G06K 15/129 |

FOREIGN PATENT DOCUMENTS

JP          2013-111777 A          6/2013

* cited by examiner

*Primary Examiner* — Jason S Uhlenhake
(74) *Attorney, Agent, or Firm* — Rimon P.C.

(57)          ABSTRACT

An inkjet printing apparatus includes: a positional displacement amount calculation unit configured to, during printing processing, calculate a positional displacement amount of printing paper in a paper width direction based on colorimetric data obtained by colorimetry of a color chart by a colorimeter; a colorimeter movement mechanism configured to move the colorimeter; and a colorimeter movement control unit configured to control an operation of the colorimeter movement mechanism based on the positional displacement amount calculated by the positional displacement amount calculation unit.

17 Claims, 31 Drawing Sheets

Fig.20

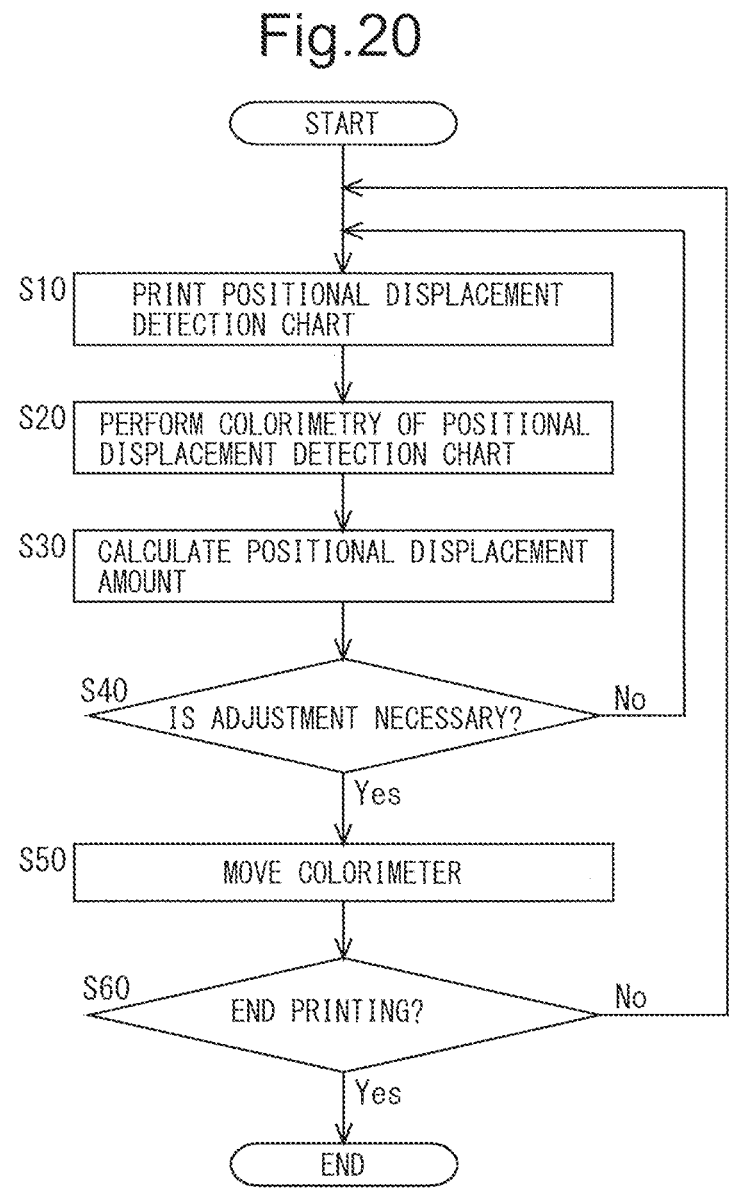

START

S10 | PRINT POSITIONAL DISPLACEMENT DETECTION CHART

S20 | PERFORM COLORIMETRY OF POSITIONAL DISPLACEMENT DETECTION CHART

S30 | CALCULATE POSITIONAL DISPLACEMENT AMOUNT

S40 | IS ADJUSTMENT NECESSARY?   No

Yes

S50 | MOVE COLORIMETER

S60 | END PRINTING?   No

Yes

END

PAPER WIDTH DIRECTION

PAPER WIDTH DIRECTION

PAPER WIDTH DIRECTION

PAPER WIDTH DIRECTION

PAPER WIDTH DIRECTION

PAPER WIDTH DIRECTION

PAPER WIDTH DIRECTION

PRINTING APPARATUS, POSITION ADJUSTMENT METHOD, AND NON-TRANSITORY COMPUTER-READABLE RECORDING MEDIUM RECORDING POSITION ADJUSTMENT PROGRAM

CROSS-REFERENCE TO RELATED APPLICATIONS

The present application claims priority from Japanese Patent Application No. 2023-050871 filed on Mar. 28, 2023, the entire contents of which are hereby incorporated by reference.

BACKGROUND OF THE INVENTION

Field of the Invention

The present invention relates to a printing apparatus, and more particularly to a technique for adjusting a relative positional relationship between a color chart recorded on a print medium for adjusting a color of a print image and a reader (typically, a colorimeter) for reading the color chart.

Description of Related Art

In recent years, inkjet printing apparatuses have become significantly widespread. An inkjet printing apparatus is provided with an ink ejection head (print head) having a large number of nozzles that eject ink typically for each of four colors (C color: cyan, M color: magenta, Y color: yellow, and K color: black) called process colors. Printing is performed by ejecting the ink from the large number of nozzles onto a print medium such as printing paper by heat or pressure.

In the inkjet printing apparatus as described above, color adjustment (for example, correction of print data after RIP processing) may be performed based on colorimetric data (colorimetric values) obtained by colorimetry of a color chart including patches of various colors. In this regard, in a case where a colorimeter built in an inkjet printing apparatus is used (that is, in a case where an in-line colorimeter is used), a color chart is recorded on a print medium by ejecting ink from an ink ejection head, and colorimetry of the color chart is performed by the colorimeter. At that time, when a positional relationship between the color chart recorded on the print medium and the colorimeter that performs colorimetry of the color chart is not appropriate, correct colorimetric data cannot be obtained. Therefore, for example, the position of the colorimeter is adjusted at the timing immediately after the colorimeter is attached or the timing immediately after the print medium is replaced.

Note that, in connection with the present invention, Japanese Laid-Open Patent Publication No. 2013-111777 discloses a technique for detecting a conveyance error with high accuracy in order to appropriately perform colorimetry of a colorimetric chart (color chart for colorimetry). According to this technique, a conveyance error amount is acquired based on a peak value obtained by performing the colorimetry of a conveyance confirmation chart as illustrated in FIG. 36, and the position of the print medium at the time of colorimetry of the colorimetric chart is adjusted based on the acquired conveyance error amount.

However, due to execution of printing under various printing conditions, a change in a state of a conveyance path of the print medium, and the like, positional displacement of the print medium in a direction orthogonal to a conveyance direction of the print medium (Hereinafter, it is simply referred to as a "conveyance direction".) may occur. Furthermore, when the print medium passes through a drying mechanism, the print medium is likely to meander due to shrinkage of the print medium or the like. From the above, it is difficult to continuously perform stable colorimetry after the position of the colorimeter is once adjusted. For example, even if the position of the colorimeter is adjusted at the timing immediately after replacement of the print medium as described above, the positional displacement of the print medium in the direction orthogonal to the conveyance direction becomes large while a large amount of printing is performed, and correct colorimetric data cannot be obtained. Therefore, in order to continuously perform stable colorimetry, it is necessary to sufficiently increase a size of the patch included in the color chart for colorimetry in the orthogonal direction (orthogonal direction with respect to the conveyance direction) with respect to a size of a colorimetric region of the colorimeter. However, when the size of the patch included in the color chart is increased, a region for recording an image based on an actual print job is narrowed.

Note that, according to the technique disclosed in Japanese Laid-Open Patent Publication No. 2013-111777, the position of the print medium is adjusted in the conveyance direction (for example, reverse conveyance of the print medium is performed). That is, the technique is a technique used for coping with the positional displacement of the print medium in the conveyance direction, and the technique cannot be applied to coping with the positional displacement of the print medium in the direction orthogonal to the conveyance direction. Furthermore, in an embodiment described in Japanese Laid-Open Patent Publication No. 2013-111777, the conveyance confirmation chart includes 14 patches arranged side by side in the direction orthogonal to the conveyance direction. Accordingly, there is a concern that the region for the image based on the actual print job becomes narrow.

SUMMARY OF THE INVENTION

Therefore, it is desired to maintain a favorable relationship with respect to a positional positional relationship between a color chart and a reader for reading the color chart even when a large amount of printing is performed, while securing a region having a sufficient size for an image based on an actual print job.

One aspect of the present invention is directed to a printing apparatus including:

a conveyance mechanism configured to convey a print medium having a long size in a first direction;

an ink ejection head that includes a plurality of ink ejection nozzles arranged in a second direction orthogonal to the first direction, and is configured to eject ink from the plurality of ink ejection nozzles toward the print medium conveyed by the conveyance mechanism;

a reader located downstream of the ink ejection head in the first direction and configured to read a color chart recorded on the print medium by ejecting ink from the ink ejection head, the color chart including a plurality of patches arranged side by side in the first direction;

a print data correction unit configured to correct print data based on read data obtained by the reader reading the color chart;

an ink ejection control unit configured to control ejection of ink from the ink ejection head based on the print data corrected by the print data correction unit;

a positional displacement amount calculation unit configured to, during conveyance of the print medium by the conveyance mechanism, calculate a positional displacement amount indicating a magnitude of positional displacement of the print medium in the second direction with respect to the reader; and a position adjustment means for, during conveyance of the print medium by the conveyance mechanism, performing position adjustment processing of, based on the positional displacement amount, adjusting a position of the reader in the second direction or a recording position of the color chart, in the second direction, at the time of being recorded next on the print medium.

According to such a configuration, the printing apparatus is provided with the positional displacement amount calculation unit configured to, during conveyance of the print medium by the conveyance mechanism, calculate a magnitude of positional displacement (a positional displacement amount) of the print medium in the second direction that is a direction orthogonal to the conveyance direction of the print medium having a long size, and a position adjustment means for, during conveyance of the print medium by the conveyance mechanism, adjusting a position of the reader configured to read the color chart or a recording position of the color chart based on the positional displacement amount calculated by the positional displacement amount calculation unit. Therefore, even if the print medium is displaced in the second direction during conveyance of the print medium having a long size, a positional relationship between the reader and the color chart is maintained in a positional relationship in which a correct colorimetric result can be obtained. Thus, even when a large amount of printing is performed, it is possible to maintain a favorable positional relationship with respect to the positional relationship between the color chart and the reader that reads the color chart. Furthermore, since the printing is suppressed from being executed using abnormal read data (for example, abnormal colorimetric data), the necessity of reprinting is reduced as compared with the related art, and the consumption amount of the print medium and the ink can be reduced. In this way, it is possible to contribute to the achievement of the SDGs (sustainable development goals).

Another aspect of the present invention is directed to a position adjustment method for, in a printing apparatus, adjusting a positional relationship between a reader and a color chart, the printing apparatus including a conveyance mechanism configured to convey a print medium having a long size in a first direction, an ink ejection head that includes a plurality of ink ejection nozzles arranged in a second direction orthogonal to the first direction and is configured to eject ink from the plurality of ink ejection nozzles toward the print medium conveyed by the conveyance mechanism, the reader located downstream of the ink ejection head in the first direction and configured to read an image recorded on the print medium by ejecting ink from the ink ejection head, a print data correction unit configured to correct print data based on read data obtained by the reader reading the color chart including a plurality of patches arranged side by side in the first direction, and an ink ejection control unit configured to control ejection of ink from the ink ejection head based on the print data corrected by the print data correction unit, the position adjustment method including:

a color chart record step of recording the color chart on the print medium by ejecting ink from the ink ejection head;

a color chart read step of reading, by the reader, the color chart recorded on the print medium;

a positional displacement amount calculation step of, during conveyance of the print medium by the conveyance mechanism, calculating a positional displacement amount indicating a magnitude of positional displacement of the print medium in the second direction with respect to the reader; and a position adjustment step of, during conveyance of the print medium by the conveyance mechanism, based on the positional displacement amount, adjusting a position of the reader in the second direction or a recording position of the color chart, in the second direction, at the time of being recorded next on the print medium.

Still another aspect of the present invention is directed to a non-transitory computer-readable recording medium that records a position adjustment program for, in a printing apparatus, adjusting a positional relationship between a reader and a color chart, the printing apparatus including a conveyance mechanism configured to convey a print medium having a long size in a first direction, an ink ejection head that includes a plurality of ink ejection nozzles arranged in a second direction orthogonal to the first direction and is configured to eject ink from the plurality of ink ejection nozzles toward the print medium conveyed by the conveyance mechanism, the reader located downstream of the ink ejection head in the first direction and configured to read an image recorded on the print medium by ejecting ink from the ink ejection head, a print data correction unit configured to correct print data based on read data obtained by the reader reading the color chart including a plurality of patches arranged side by side in the first direction, and an ink ejection control unit configured to control ejection of ink from the ink ejection head based on the print data corrected by the print data correction unit, the position adjustment program causing a computer included in the printing apparatus to execute:

a color chart record step of controlling ejection of ink from the ink ejection head so that the color chart is recorded on the print medium;

a color chart read step of causing the reader to read the color chart recorded on the print medium;

a positional displacement amount calculation step of, during conveyance of the print medium by the conveyance mechanism, calculating a positional displacement amount indicating a magnitude of positional displacement of the print medium in the second direction with respect to the reader; and a position adjustment step of, during conveyance of the print medium by the conveyance mechanism, based on the positional displacement amount, adjusting a position of the reader in the second direction or a recording position of the color chart, in the second direction, at the time of being recorded next on the print medium.

These and other objects, features, modes, and advantageous effects of the present invention will become more apparent from the following detailed description of the present invention with reference to the accompanying drawings.

BRIEF DESCRIPTION OF THE DRAWINGS

FIG. 20 is a flowchart showing a procedure of a series of processing for position adjustment of the colorimeter in the embodiment;

DETAILED DESCRIPTION OF PREFERRED EMBODIMENTS

Hereinafter, an embodiment of the present invention will be described with reference to the accompanying drawings. Note that, in the following description, a direction orthogonal to a conveyance direction of the printing paper is referred to as a "paper width direction". The conveyance direction of the printing paper corresponds to a first direction, and the paper width direction corresponds to a second direction.

1. OVERALL CONFIGURATION OF PRINTING SYSTEM

Figure 1:
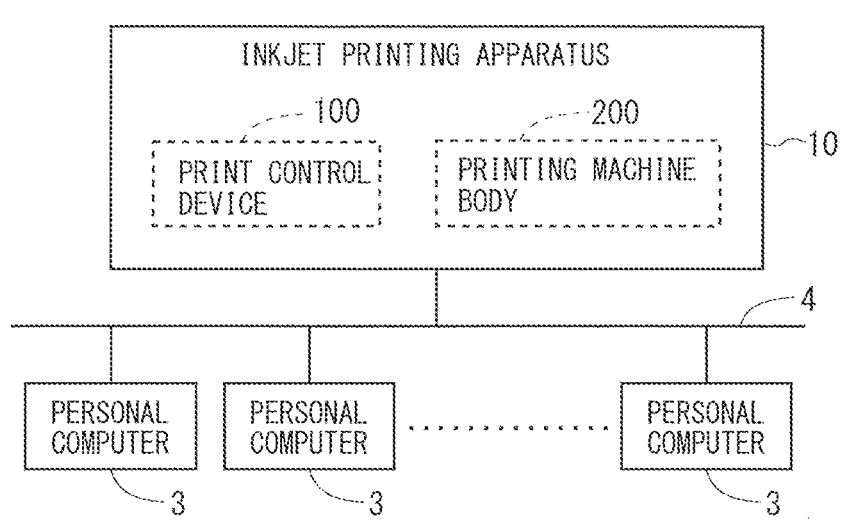
FIG. 1 is an overall configuration diagram of a printing system according to an embodiment of the present invention.

FIG. 1 is an overall configuration diagram of a printing system according to an embodiment of the present invention. The printing system includes an inkjet printing apparatus 10 and a plurality of personal computers 3. The inkjet printing apparatus 10 and the plurality of personal computers 3 are connected to each other by a LAN 4. The inkjet printing apparatus 10 includes a printing machine body 200 and a print control device 100 that controls an operation of the printing machine body 200. A print workflow management system, which is application software for managing a print workflow, is installed in the print control device 100. Furthermore, the print control device 100 also generates print data by performing RIP processing or the like on submitted data such as a PDF file provided from each of the personal computers 3. The printing machine body 200 outputs a print image on printing paper as a print medium based on print data generated by the print control device 100 without using a printing plate. In the personal computer 3, for example, various operations are performed on the print workflow management system installed in the print control device 100.

2. CONFIGURATION OF INKJET PRINTING APPARATUS

Figure 2:
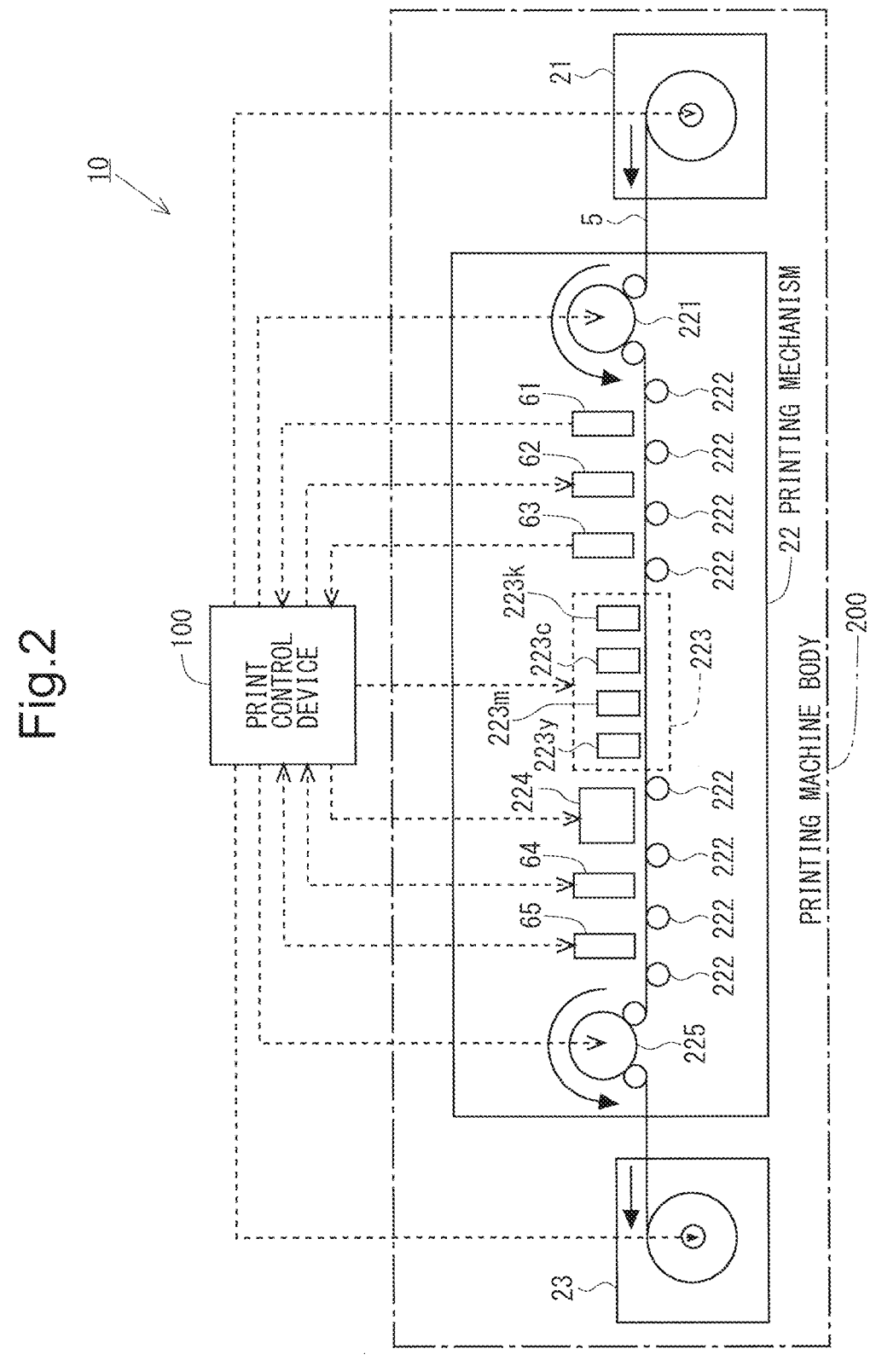
FIG. 2 is a schematic diagram illustrating one configuration example of an inkjet printing apparatus in the embodiment.

FIG. 2 is a schematic diagram illustrating one configuration example of the inkjet printing apparatus 10. As described above, the inkjet printing apparatus 10 includes the print control device 100 and the printing machine body 200.

The printing machine body 200 includes a paper feeding unit 21 that unwinds the printing paper (in this example, a printing paper having a long size in the conveyance direction) 5 from a roll and supplies the same to a printing mechanism 22, the printing mechanism 22 that performs printing on the printing paper 5, and a paper winding unit 23 that winds the printing paper 5 after printing in a roll form.

The printing mechanism 22 includes a first drive roller 221 for conveying the printing paper 5 to the inside, a plurality of support rollers 222 for conveying the printing paper 5 inside the printing mechanism 22, a recording unit 223 for recording a print image on the printing paper 5, a drying mechanism 224 for drying the printing paper 5 on which the print image is recorded, and a second drive roller 225 for outputting the printing paper 5 from the inside of the printing mechanism 22. A conveyance mechanism that conveys the printing paper 5 in a predetermined conveyance direction is realized by the paper feeding unit 21, the first drive roller 221, the plurality of support rollers 222, the second drive roller 225, and the paper winding unit 23. The recording unit 223 includes one or more ink ejection heads 223k that eject K color (black) ink, one or more ink ejection heads 223c that eject C color (cyan) ink, one or more ink ejection heads 223m that eject M color (magenta) ink, and one or more ink ejection heads 223y that eject Y color (yellow) ink. Each of the ink ejection heads 223k, 223c, 223m, and 223y is a so-called line head elongated in the paper width direction, and includes a plurality of ink ejection nozzles arranged side by side over a length corresponding to the entire width of the printing paper 5 in the paper width direction. The ink ejection heads 223k, 223c, 223m, and 223y eject ink droplets from the ink ejection nozzles in synchronization with the conveyance speed of the printing paper 5 toward the upper surface of the printing paper 5 continuously conveyed in the conveyance direction by the first drive roller 221, the second drive roller 225, and the like, thereby forming a two-dimensional recording image by one pass on an upper surface of the printing paper 5.

Furthermore, the printing mechanism 22 internally includes an edge detection sensor 61 that detects a position (Hereinafter, it is referred to as an "edge position".) of one end portion, in the paper width direction, of the printing paper 5 conveyed by the conveyance mechanism, a meandering correction mechanism 62 that adjusts a position of the printing paper 5 in the paper width direction on the basis of the edge position detected by the edge detection sensor 61 and a size of the printing paper 5, a Q mark detection sensor

63 that detects a Q mark representing a start position of a printing region corresponding to each page, a colorimeter 64 that measures s a color of a predetermined portion of the print image recorded on the printing paper 5 by the recording unit 223, and an in-line scanner 65 as an imaging device that captures the print image. The edge detection signal obtained by the edge detection sensor 61, the Q mark detection signal obtained by the Q mark detection sensor 63, the colorimetric data obtained by the colorimeter 64, and the imaging data obtained by the in-line scanner 65 are sent to the print control device 100.

Note that the configuration illustrated in FIG. 2 is an example, and the configuration of the printing machine body 200 is not limited thereto. For example, a configuration not including the Q mark detection sensor 63 can be adopted, or a configuration including a plurality of the meandering correction mechanisms 62 can be adopted.

Figure 3:
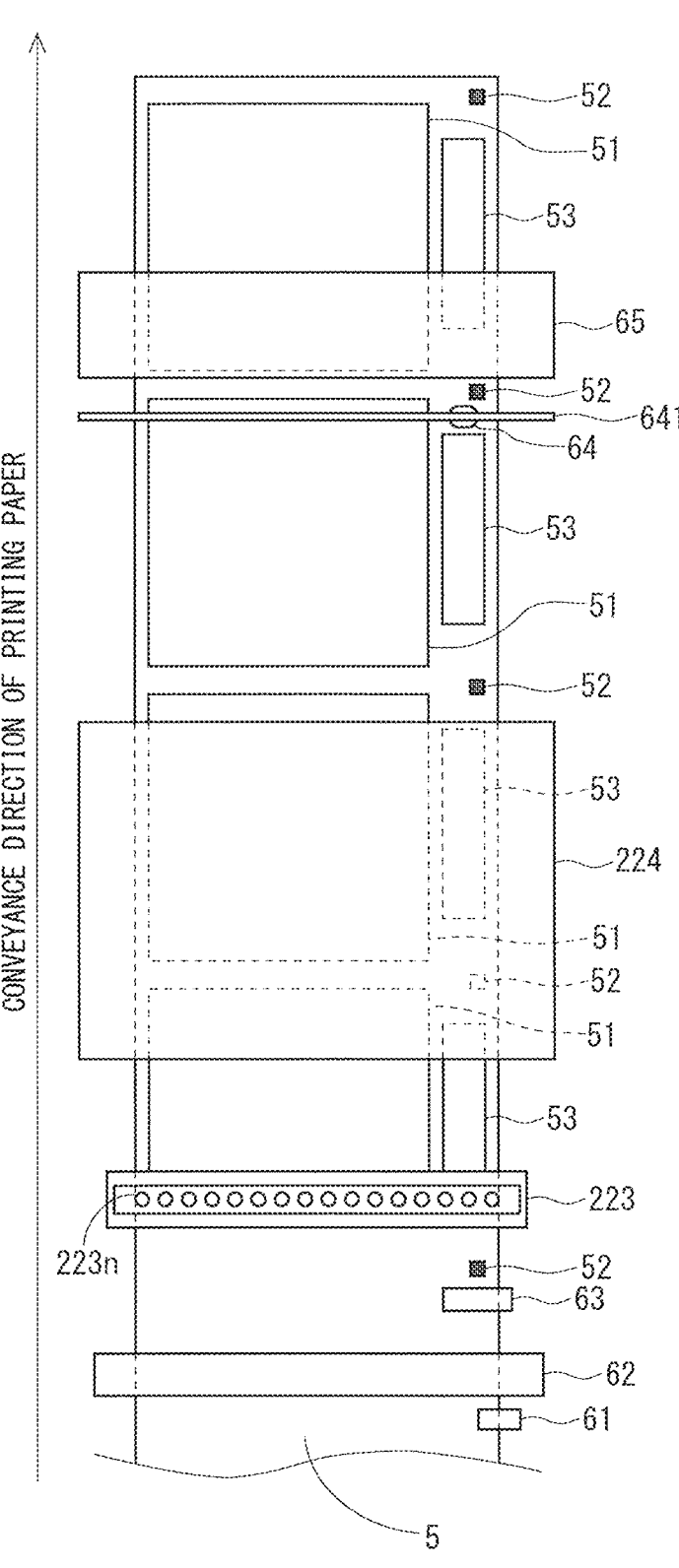
FIG. 3 is a schematic plan view of a main part of a printing mechanism as viewed from above in the embodiment.

FIG. 3 is a schematic plan view of a main part of the printing mechanism 22 as viewed from above. In the ink ejection head 223k of the recording unit 223, a plurality of nozzles 223n is arranged in the paper width direction. The recording unit 223 includes the plurality of ink ejection heads 223k, 223c, 223m, and 223y as described above, but here, for the sake of simplicity, only the ink ejection head 223k that ejects K color (black) ink is illustrated. The printing paper 5 is continuously conveyed from the lower side to the upper side in FIG. 3. In the process of conveying the printing paper 5, the edge position described above is detected by the edge detection sensor 61, and the position of the printing paper 5 is adjusted by the meandering correction mechanism 62 based on the edge position and the size of the printing paper 5. Then, after a Q mark 52 is detected by the Q mark detection sensor 63, an image is recorded by the recording unit 223. At that time, an image based on a print job is recorded in a predetermined actual image print region 51. Furthermore, the recording unit 223 records a color chart 53 for colorimetry in a region outside the actual image printing region 51. The printing paper 5 on which the print image is recorded passes through the drying mechanism 224. As a result, the printing paper 5 is dried. Thereafter, colorimetry of the color chart 53 is performed by the colorimeter 64, and further, a print image is captured by the in-line scanner 65. Note that, in the present embodiment, an end detection sensor is realized by the edge detection sensor 61.

As can be grasped from FIGS. 2 and 3, the colorimeter 64 and the in-line scanner 65 are provided on a downstream side of the drying mechanism 224 in the conveyance direction of the printing paper 5. Furthermore, the colorimeter 64 and the in-line scanner 65 are arranged at positions displaced downstream from the recording unit 223 in a direction orthogonal to an arrangement direction of the plurality of nozzles 223n in the recording unit 223.

Figure 4:
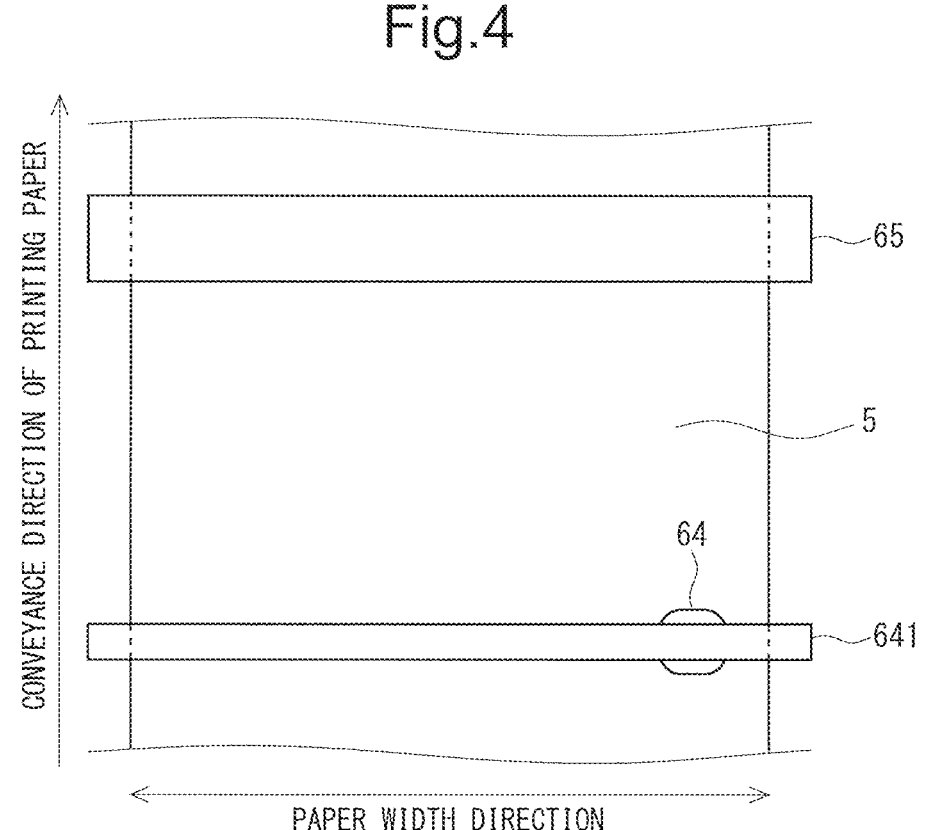
FIG. 4 is a plan view for explaining an arrangement configuration of a colorimeter and an in-line scanner in the embodiment.

FIG. 4 is a plan view for explaining an arrangement configuration of the colorimeter 64 and the in-line scanner 65. The colorimeter 64 is a device that outputs CMYK density values and Lab values as colorimetric values, and can output, as colorimetric values, absolute color information conforming to a standard such as international commission on illumination (CIE) without being affected by an environment such as a temperature. Also, the colorimeter 64 measures color in a spot manner in a small region at a predetermined position in the print image, and is provided with a colorimeter movement mechanism 641 for moving the colorimeter to a position where colorimetry is to be performed. The colorimeter movement mechanism 641 is configured so that the colorimeter 64 can move in the paper width direction at least over the entire width of the printing paper 5. The colorimeter movement mechanism 641 includes, for example, a guide member that guides the colorimeter 64, a feed mechanism such as a rack pinion or a feed screw that moves the colorimeter 64, a motor as a drive source of the feed mechanism, and the like.

The in-line scanner 65 includes a plurality of imaging elements arranged side by side over a length corresponding to the entire width of the printing paper 5 in the paper width direction. As the in-line scanner 65, for example, a contact image sensor (CIS) or a charge coupled device (CCD) is adopted. The in-line scanner 65 acquires luminance values of RGB using a color filter, and outputs imaging data including the luminance values of RGB.

3. CONFIGURATION OF PRINT CONTROL DEVICE

<3.1 Hardware Configuration>

Figure 5:
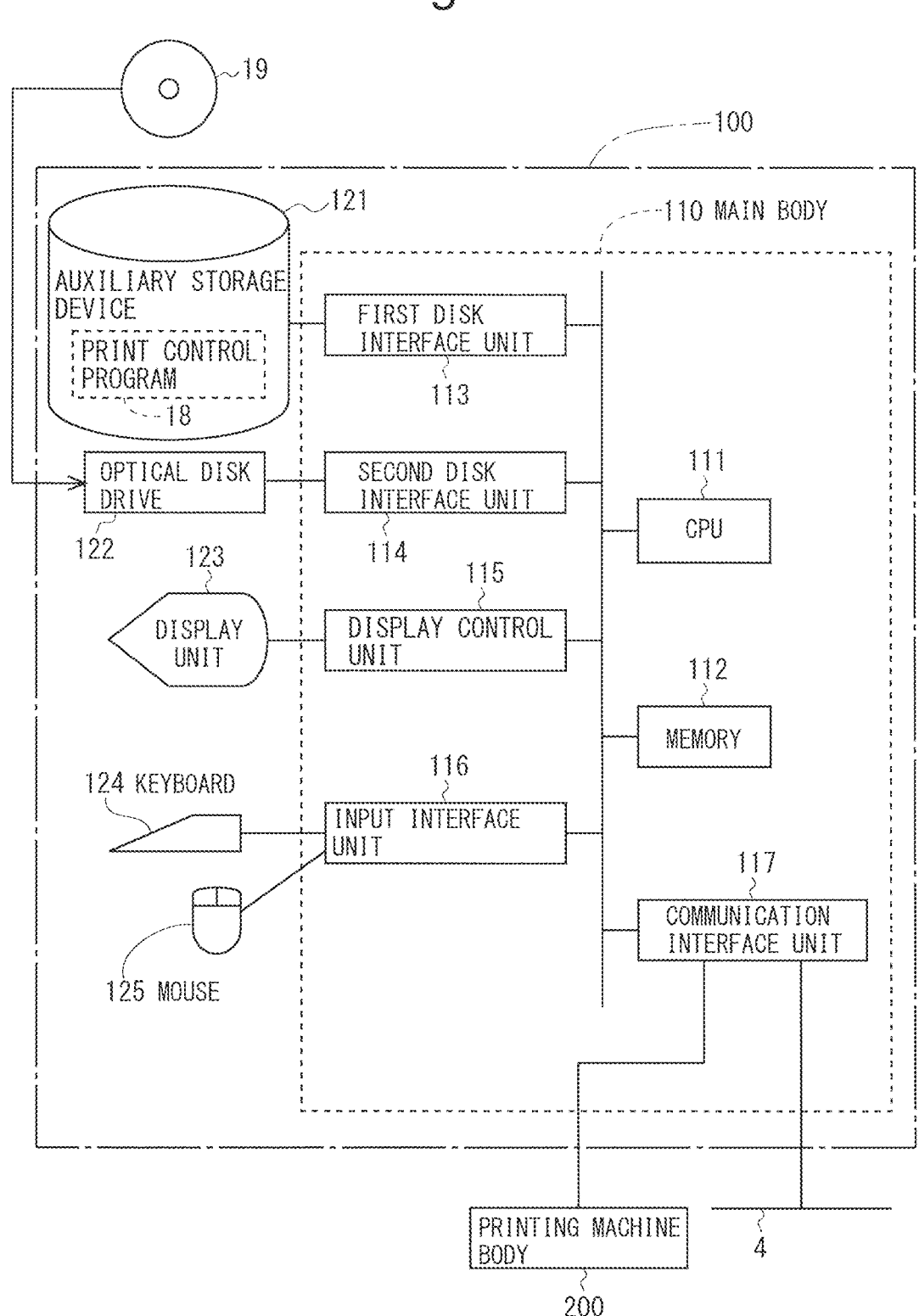
FIG. 5 is a block diagram illustrating a hardware configuration of a print control device according to the embodiment.

FIG. 5 is a block diagram illustrating a hardware configuration of the print control device 100. As illustrated in FIG. 5, the print control device 100 includes a main body 110, an auxiliary storage device 121, an optical disk drive 122, a display unit 123, a keyboard 124, a mouse 125, and the like. The main body 110 includes a CPU 111, a memory 112, a first disk interface unit 113, a second disk interface unit 114, a display control unit 115, an input interface unit 116, and a communication interface unit 117. The CPU 111, the memory 112, the first disk interface unit 113, the second disk interface unit 114, the display control unit 115, the input interface unit 116, and the communication interface unit 117 are connected to each other via a system bus. The auxiliary storage device 121 is connected to the first disk interface unit 113. The optical disk drive 122 is connected to the second disk interface unit 114. The display unit (display device) 123 is connected to the display control unit 115. The keyboard 124 and the mouse 125 are connected to the input interface unit 116. The printing machine body 200 is connected to the communication interface unit 117 via a communication cable. Furthermore, the communication interface unit 117 is connected to the LAN 4. The auxiliary storage device 121 is a magnetic disk device or the like. An optical disk 19 as a computer-readable recording medium such as a CD-ROM or a DVD-ROM is inserted into the optical disk drive 122. The display unit 123 is a liquid crystal display or the like. The display unit 123 is used to display information desired by an operator. The keyboard 124 and the mouse 125 are used by a worker to input instructions to the print control device 100.

The auxiliary storage device 121 stores a print control program (program for controlling execution of print processing by the printing machine body 200) 18. The CPU 111 implements various functions of the print control device 100 by reading the print control program 18 stored in the auxiliary storage device 121 into the memory 112 and executing the program. The memory 112 includes a random access memory (RAM) and a read only memory (ROM). The memory 112 functions as a work area for the CPU 111 to execute the print control program 18 stored in the auxiliary storage device 121. Note that the print control program 18 is provided by being stored in the computer-readable recording medium (non-transitory recording medium). That is, for example, the user purchases the optical disk 19 as a recording medium of the print control program 18, inserts the optical disk into the optical disk drive 122, reads the print control program 18 from the optical disk 19, and installs the print control program in the auxiliary storage device 121. Alternatively, the print control program 18 stored in the server at the remote location may be downloaded via the communication interface unit 117 and installed in the auxiliary storage device 121.

<3.2 Functional Configuration>

Figure 6:
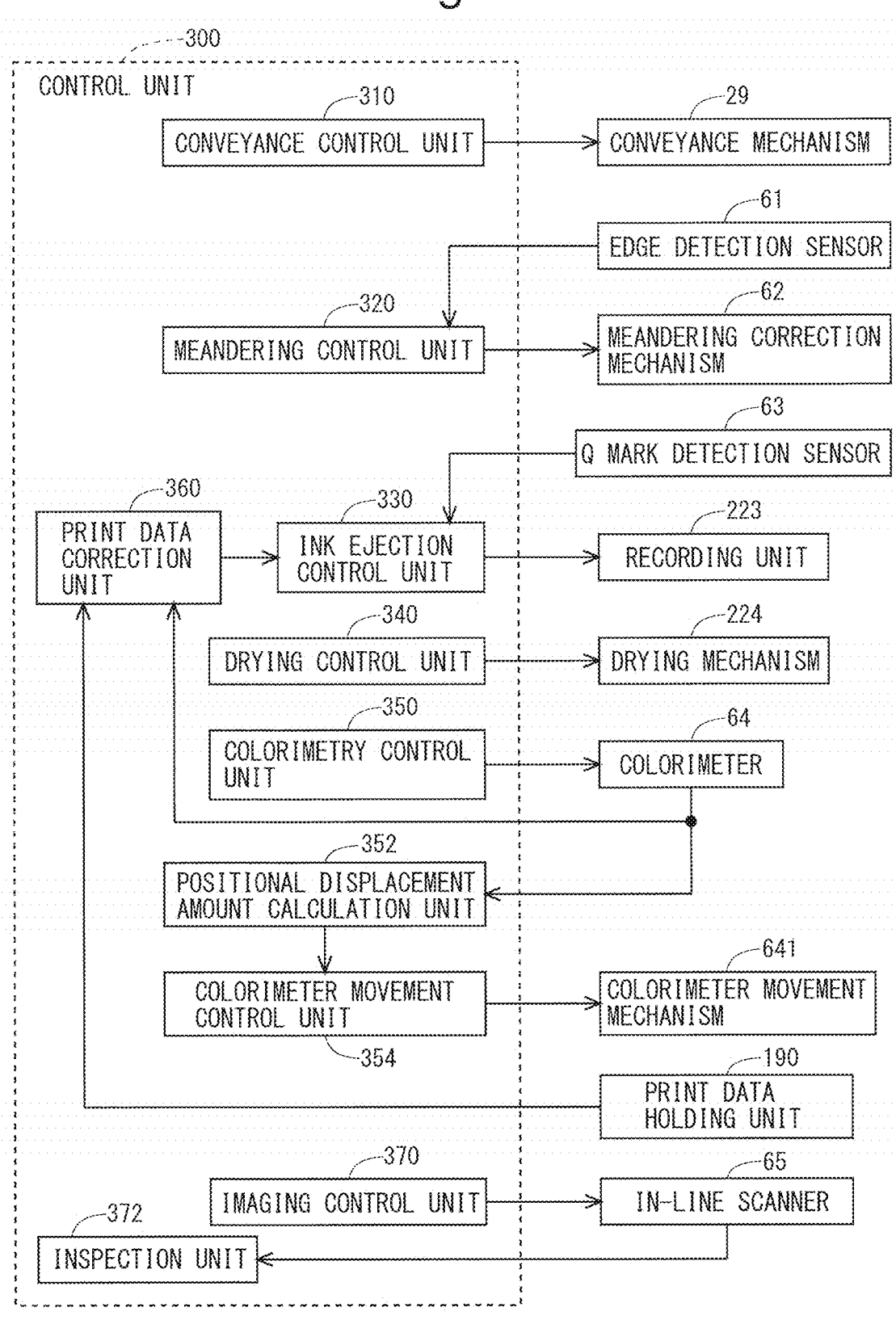
FIG. 6 is a block diagram illustrating a functional configuration of a control unit realized by executing a print control program in the print control device in the embodiment.

FIG. 6 is a block diagram illustrating a functional configuration of the control unit 300 realized by executing the print control program 18 in the print control device 100. The control unit 300 includes a conveyance control unit 310, a meandering control unit 320, an ink ejection control unit 330, a drying control unit 340, a colorimetry control unit 350, a positional displacement amount calculation unit 352, a colorimeter movement control unit 354, a print data correction unit 360, an imaging control unit 370, and an inspection unit 372.

The conveyance control unit 310 controls the speed (conveyance speed) at which the conveyance mechanism 29 conveys the printing paper 5. The meandering control unit 320 repeatedly controls the operation of the meandering correction mechanism 62 so that the position of the printing paper 5 is suitably adjusted based on the edge detection signal repeatedly detected by the edge detection sensor 61 (that is, based on the edge position) during the conveyance in which the conveyance mechanism 29 conveys the printing paper 5.

The ink ejection control unit 330 controls the ejection of ink from each nozzle included in the ink ejection heads 223k, 223c, 223m, and 223y constituting the recording unit 223 based on the Q mark detection signal obtained by the Q mark detection sensor 63 and the print data corrected by the print data correction unit 360. For example, the ink ejection timing and the ink ejection amount are controlled. The drying control unit 340 controls a temperature (drying temperature) at which the drying mechanism 224 dries the printing paper 5.

The colorimetry control unit 350 controls the operation of the colorimeter 64. The positional displacement amount calculation unit 352 repeatedly calculates a positional displacement amount representing a magnitude of displacement (positional displacement) from an ideal position (position where colorimetry of the color chart 53 by the colorimeter 64 is correctly performed) of the printing paper 5 in the paper width direction based on the colorimetric data repeatedly acquired by the colorimeter 64, during conveyance in which the conveyance mechanism 29 conveys the printing paper 5. The colorimeter movement control unit 354 repeatedly controls the operation of the colorimeter movement mechanism 641 during conveyance of the printing paper 5 based on the positional displacement amount calculated by the positional displacement amount calculation unit 352. As a result, the colorimeter 64 moves so that the colorimeter 64 correctly performs the colorimetry of the color chart 53. That is, the position of the colorimeter 64 is adjusted in the paper width direction.

The print data correction unit 360 corrects the print data after the RIP processing held in a print data holding unit 190 based on the colorimetric data obtained by the colorimeter 64. As an example, when a decrease in the density of the C color (cyan color) is detected on the basis of the colorimetric data, the print data is corrected so that the ejection amount of the C color ink increases. The imaging control unit 370 controls the imaging timing of the print image by the in-line scanner 65. The inspection unit 372 inspects the quality of the print image based on the imaging data obtained by the in-line scanner 65.

Note that, in the present embodiment, a position adjustment means is realized by the colorimeter movement control unit 354 and the colorimeter movement mechanism 641, and a movement mechanism control unit is realized by the colorimeter movement control unit 354.

4. POSITION ADJUSTMENT OF COLORIMETER

In the present embodiment, in parallel with the printing processing, the position of the colorimeter 64 is adjusted so that the color of the color chart 53 is correctly measured even if the position of the printing paper 5 is displaced in the paper width direction during the period in which the printing paper 5 is conveyed by the conveyance mechanism 29. This will be described below.

<4.1 Configuration of Color Chart>

Figure 7:
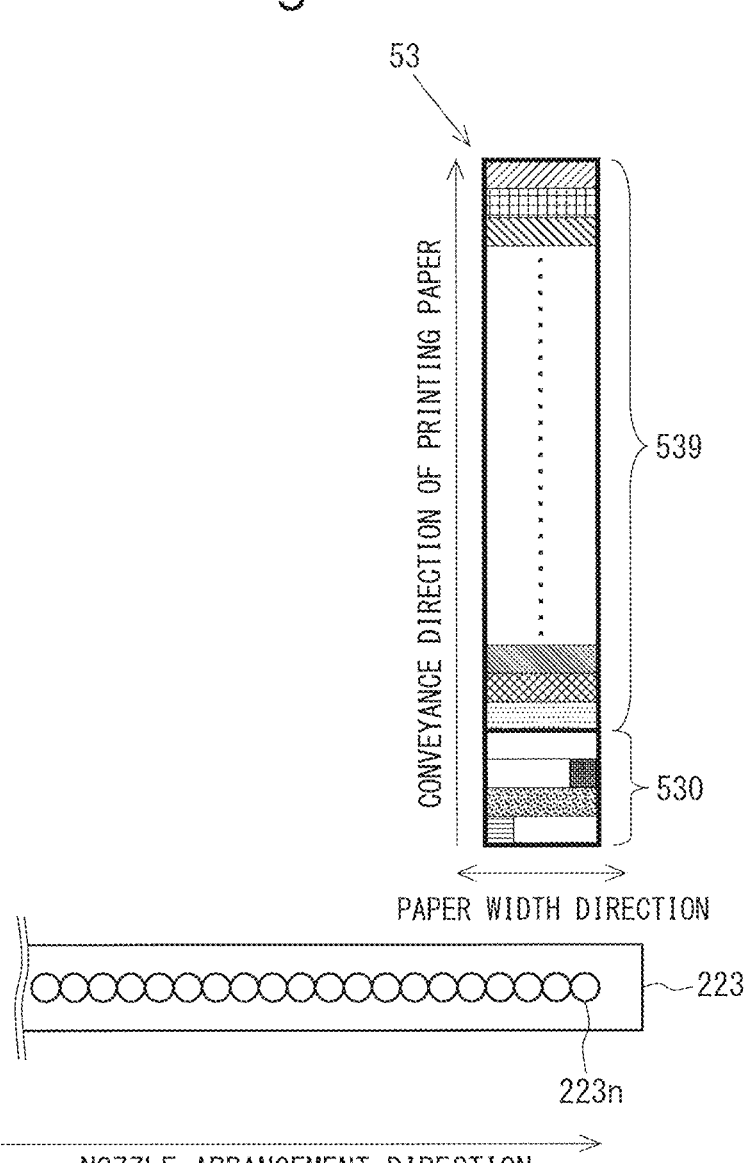
FIG. 7 is a diagram for explaining a schematic configuration of a color chart in the embodiment.

As schematically illustrated in FIG. 7, the color chart 53 in the present embodiment includes a normal colorimetric chart 539 including a plurality of patches to be subjected to normal colorimetry for adjusting the color of the print image, and a positional displacement detection chart 530 including a plurality of patches for calculating the positional displacement amount of the printing paper 5. During the execution of the print processing based on the print job, such a color chart 53 is printed, for example, in a margin portion of the printing paper 5 by the plurality of nozzles 223$n$ in the recording unit 223. Note that, according to the example illustrated in FIG. 7, the normal colorimetric chart 539 and the positional displacement detection chart 530 are continuously printed, but the normal colorimetric chart 539 and the positional displacement detection chart 530 may be separately printed.

Figure 8:
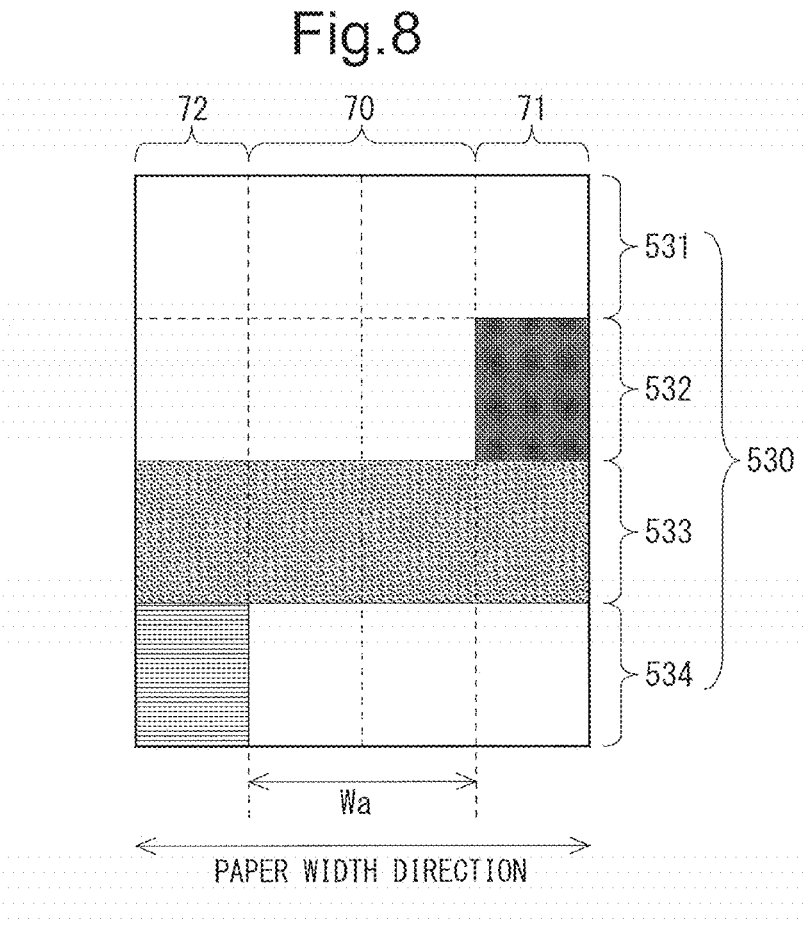
FIG. 8 is a diagram schematically illustrating a positional displacement detection chart according to the embodiment.

FIG. 8 is a diagram schematically illustrating the positional displacement detection chart 530 according to the present embodiment. As illustrated in FIG. 8, the positional displacement detection chart 530 includes a patch (Hereinafter, it is referred to as a "paper white patch".) 531 in which no ink is painted, a patch (Hereinafter, it is referred to as a "first positional displacement detection patch".) 532 in which only a region near one end side in the paper width direction is painted with a predetermined color, a patch (Hereinafter, it is referred to as a "reference patch".) 533 in which the entire region is painted with a predetermined color, and a patch (Hereinafter, it is referred to as a "second positional displacement detection patch".) 534 in which only a region near the other end side in the paper width direction is painted with a predetermined color. Note that a print medium color patch is realized by the paper white patch 531. The color included in the first positional displacement detection patch 532, the color included in the reference patch 533, and the color included in the second positional displacement detection patch 534 are preferably different from each other. Hereinafter, the color included in the first positional displacement detection patch 532 is referred to as a "first predetermined color", the color included in the reference patch 533 is referred to as a "reference color", and the color included in the second positional displacement detection patch 534 is referred to as a "second predetermined color". Furthermore, regarding the positional displacement detection chart 530 illustrated in FIG. 8, a region denoted by reference sign 70 is referred to as a "central region", a region denoted by reference sign 71 is referred to as a "right end region", and a region denoted by reference sign 72 is referred to as a "left end region". As can be grasped from FIG. 8, for the first positional displacement detection patch 532, only the right end region 71 is painted with the first predetermined color, and for the second positional displacement detection patch 534, only the left end region 72 is painted with the second predetermined color. The colorimeter 64 includes a reading optical system (not illustrated), and an aperture that defines the size of a reading spot (colorimetric range/reading range) of the colorimeter 64 on the printing paper 5 is interposed in the middle of the reading optical system.

The length of the arrow denoted by the reference sign Wa in FIG. 8 represents the length of the colorimetric range by the colorimeter 64 in the paper width direction (the length of the reading spot of the colorimeter 64 in the paper width direction), and is equal to the width (the length in the paper width direction) of the central region 70. Since the length of the reading spot of the colorimeter 64 in the paper width direction is equal to the width of the central region 70, when the positional relationship between the colorimeter 64 and the color chart 53 is an ideal positional relationship, only the central region 70 is included in the colorimetric range, and the right end region 71 and the left end region 72 are out of the colorimetric range. The width of right end region 71 is equal to the width of left end region 72, and the width of central region 70 is equal to the sum of the width of right end region 71 and the width of left end region 72. Since the width of the positional displacement detection chart 530 is equal to the width of the normal colorimetric chart 539 (see FIG. 7), it is possible to record the color chart 53 in a margin portion of the printing paper 5 while securing a region having a sufficient size for an image based on an actual print job.

As above, the positional displacement detection chart 530 in the present embodiment includes the first positional displacement detection patch 532 in which only a region that is on one end side in the paper width direction and is outside the colorimetric range of the colorimeter 64 when the positional relationship between the colorimeter 64 and the color chart 53 is an ideal positional relationship is painted with the first predetermined color, the second positional displacement detection patch 534 in which only a region that is on the other end side in the paper width direction and is outside the colorimetric range of the colorimeter 64 when the positional relationship between the colorimeter 64 and the color chart 53 is an ideal positional relationship is painted with the second predetermined color, the paper white patch (print medium color patch) 531 on which no ink is painted, and the reference patch 533 entirely painted with a predetermined color.

<4.2 Relationship Between Position of Reading Spot of Colorimeter and Colorimetric Value Obtained by Colorimetry>

Figure 9:
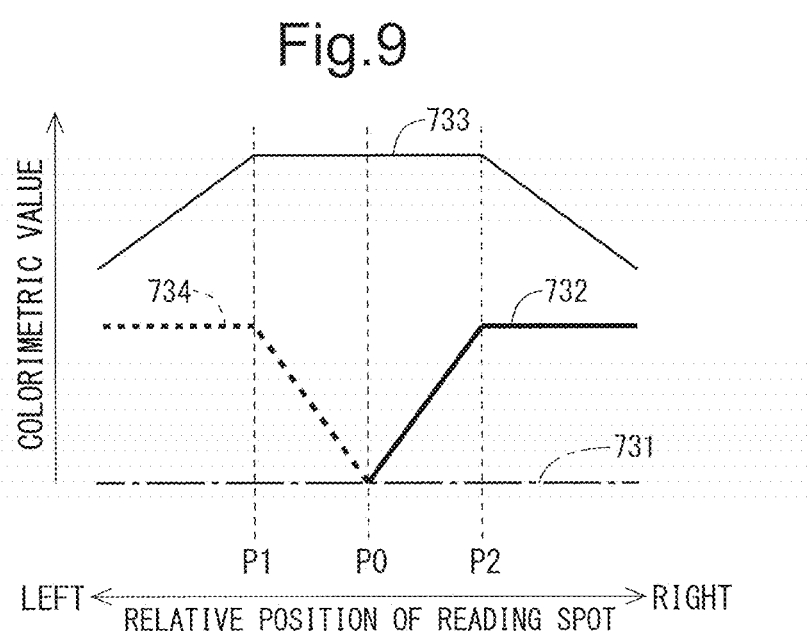
FIG. 9 is a diagram for explaining a relationship between a relative position of a reading spot of a colorimeter and a colorimetric value obtained by colorimetry of each patch included in the positional displacement detection chart in the embodiment.

FIG. 9 is a diagram for explaining the relationship between the position (Hereinafter, it is referred to as a "relative position of the reading spot" for convenience of description.) of the center of the reading spot in the paper width direction with reference to the center of the positional displacement detection chart 530 recorded on the printing paper 5 in the paper width direction and the colorimetric values obtained by colorimetry of the patches included in the positional displacement detection chart 530. The position denoted by the reference sign P0 is an ideal position of the relative position of the reading spot. A one-dot chain line denoted by reference sign 731 represents a colorimetric value obtained by colorimetry of the paper white patch 531. A thick solid line denoted by reference sign 732 represents a colorimetric value obtained by colorimetry of the first positional displacement detection A solid line denoted by reference sign 733 patch 532, represents a colorimetric value obtained by colorimetry of the reference patch 533. A thick dotted line denoted by reference sign 734 represents a colorimetric value obtained by colorimetry of the second positional displacement detection patch 534.

The colorimetric value obtained by the colorimetry of the reference patch 533 becomes the maximum value when the relative position of the reading spot is between P1 and P2. When the relative position of the reading spot is P0 (ideal position), the colorimetric value obtained by colorimetry of the first positional displacement detection patch 532 and the colorimetric value obtained by colorimetry of the second positional displacement detection patch 534 are equal to the colorimetric value obtained by colorimetry of the paper white patch 531. When the relative position of the reading spot is displaced to the left from P0 (That is, when the printing paper 5 is displaced to the right toward the conveyance direction, and as a result, the position on which the positional displacement detection chart 530 is printed by the recording unit 223 is displaced to the left in the nozzle arrangement direction), the colorimetric value obtained by colorimetry of the second positional displacement detection patch 534 (the colorimetric value of the second predetermined color) increases as the positional displacement amount increases. When the relative position of the reading spot reaches P1, the colorimetric value obtained by the colorimetry of the second positional displacement detection patch 534 becomes the maximum value. When the relative position of the reading spot is further displaced to the left from P1, the colorimetric value obtained by colorimetry of the reference patch 533 decreases as the positional displacement amount increases. When the relative position of the reading spot is displaced to the right from P0 (That is, when the printing paper 5 is displaced to the left toward the conveyance direction, and as a result, the position on which the positional displacement detection chart 530 is printed by the recording unit 223 is displaced to the right in the nozzle arrangement direction), the colorimetric value obtained by the colorimetry of the first positional displacement detection patch 532 (the colorimetric value of the first predetermined color) increases as the positional displacement amount increases. When the relative position of the reading spot reaches P2, the colorimetric value obtained by the colorimetry of the first positional displacement detection patch 532 becomes the maximum value. When the relative position of the reading spot is further displaced to the right from P2, the colorimetric value obtained by colorimetry of the reference patch 533 decreases as the positional displacement amount increases.

<4.3 Positional Displacement (Change in Relative Position of Reading Spot) and Handling of Positional Displacement>

Next, how the colorimetric value changes with the change in the relative position of the reading spot will be described in more detail, and how the inkjet printing apparatus 10 according to the present embodiment handles the positional displacement will be described. Here, in particular, a case where the relative position of the reading spot in the initial state is P0 (ideal position) and the relative position of the reading spot is gradually displaced to the right (That is, a case where the printing paper 5 is gradually displaced to the left toward the conveyance direction.) will be focused on.

Figure 10:
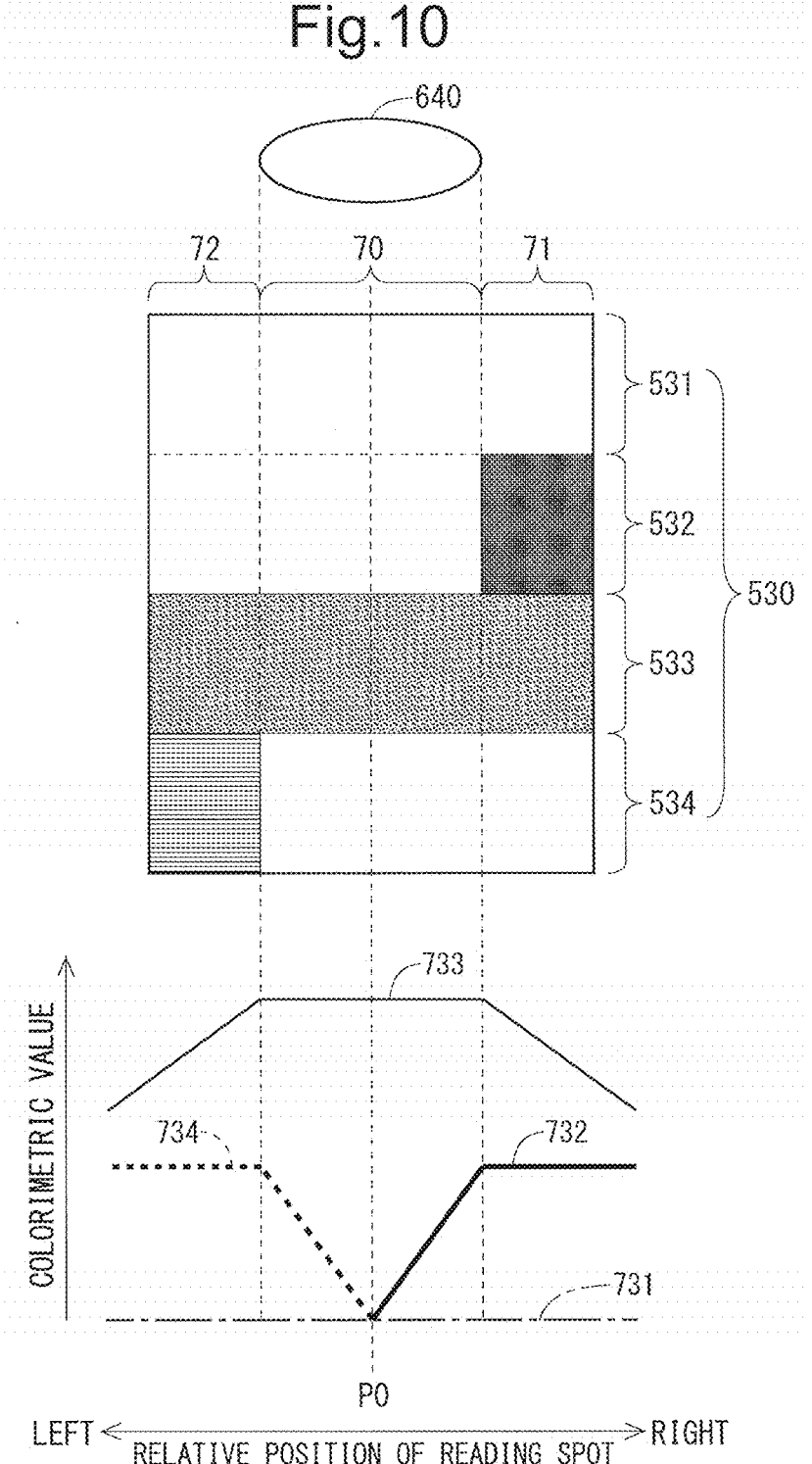
FIG. 10 is a diagram for explaining a relationship between a position of a reading spot of a colorimeter and a colorimetric value obtained by colorimetry in the embodiment.

FIG. 10 is a diagram schematically illustrating a positional relationship between the reading spot 640 and the positional displacement detection chart 530 when the relative position of the reading spot 640 is at an ideal position. As can be grasped from FIG. 10, when the relative position of the reading spot 640 is at an ideal position, only the central region 70 is included in the colorimetric range. In other words, the right end region 71 and the left end region 72 are not included in the colorimetric range. Therefore, at this time, as described above, the colorimetric value obtained by the colorimetry of the first positional displacement detection patch 532 and the colorimetric value obtained by the colorimetry of the second positional displacement detection patch 534 are equal to the colorimetric value obtained by the colorimetry of the paper white patch 531. Furthermore, for the reference patch 533, the entire central region 70 (the entire colorimetric range) is painted with the reference color. Therefore, at this time, as described above, the colorimetric value obtained by the colorimetry of the reference patch 533 becomes the maximum value.

Figure 11:
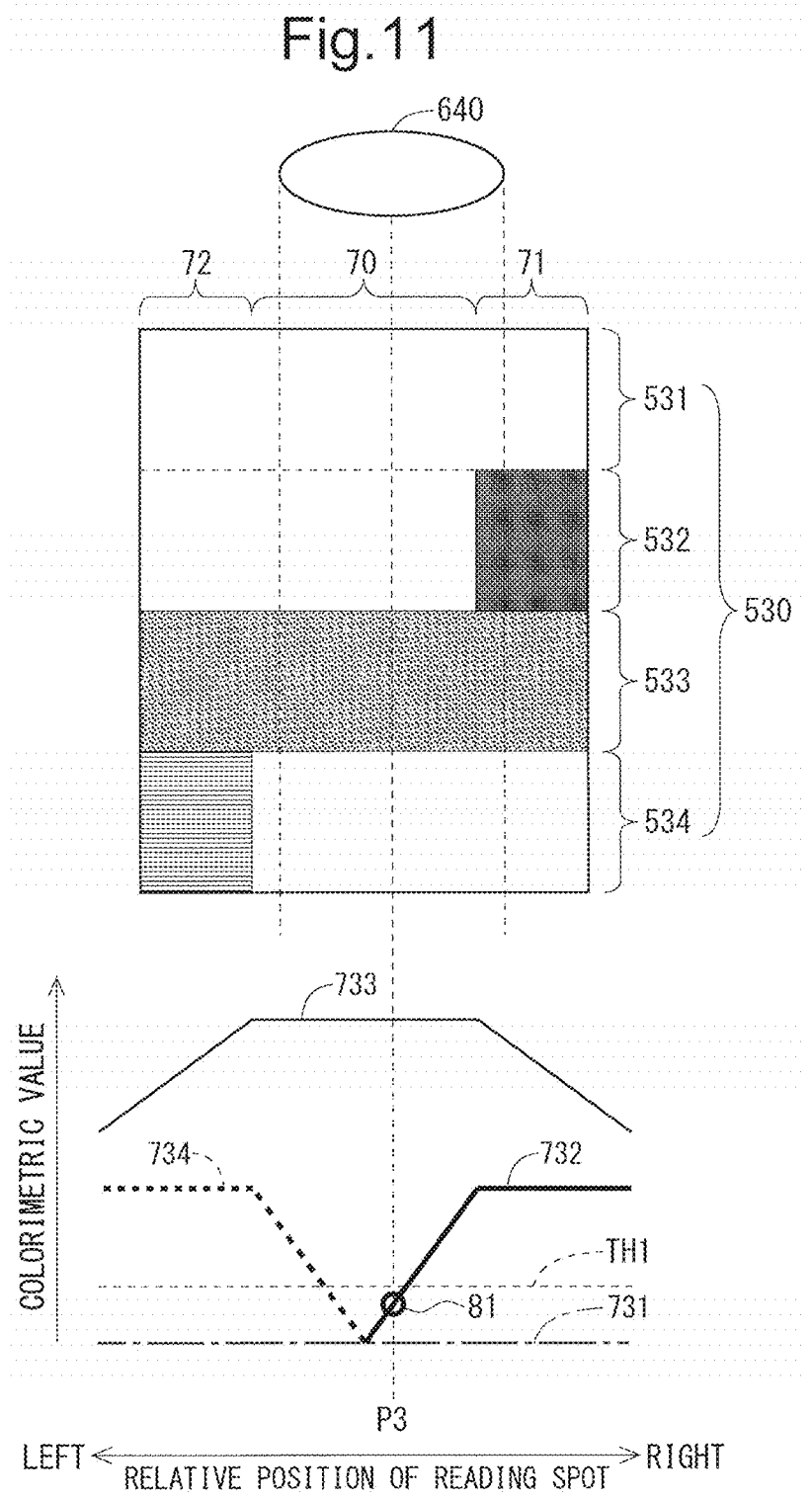
FIG. 11 is a diagram for explaining a relationship between a position of a reading spot of a colorimeter and a colorimetric value obtained by colorimetry in the embodiment.

FIG. 11 is a diagram schematically illustrating a positional relationship between the reading spot 640 and the positional displacement detection chart 530 when the relative position of the reading spot 640 is slightly displaced to the right from the state illustrated in FIG. 10. A position denoted by reference sign P3 in FIG. 11 is a relative position of the reading spot 640 at this time. At this time, as can be grasped from FIG. 11, a part of the right end region 71 is included in the colorimetric range. Therefore, the colorimeter 64 detects the first predetermined color included in the first positional displacement detection patch 532. As a result, a colorimetric value corresponding to a portion denoted by reference sign 81 in FIG. 11 is obtained as a result of the colorimetry of the first positional displacement detection patch 532. However, the colorimetric value is less than or equal to a predetermined threshold value TH1. In such a case, in the present embodiment, no handling of the positional displacement is performed. That is, even if the first predetermined color included in the first positional displacement detection patch 532 or the second predetermined color included in the second positional displacement detection patch 534 is detected by colorimetry, if the colorimetric value obtained by the colorimetry is less than or equal to the threshold value TH1, no handling of the positional displacement is performed. Note that, since the entire colorimetric range of the reference patch 533 is painted with the reference color, at this time, the colorimetric value obtained by the colorimetry of the reference patch 533 is the maximum value.

Figure 12:
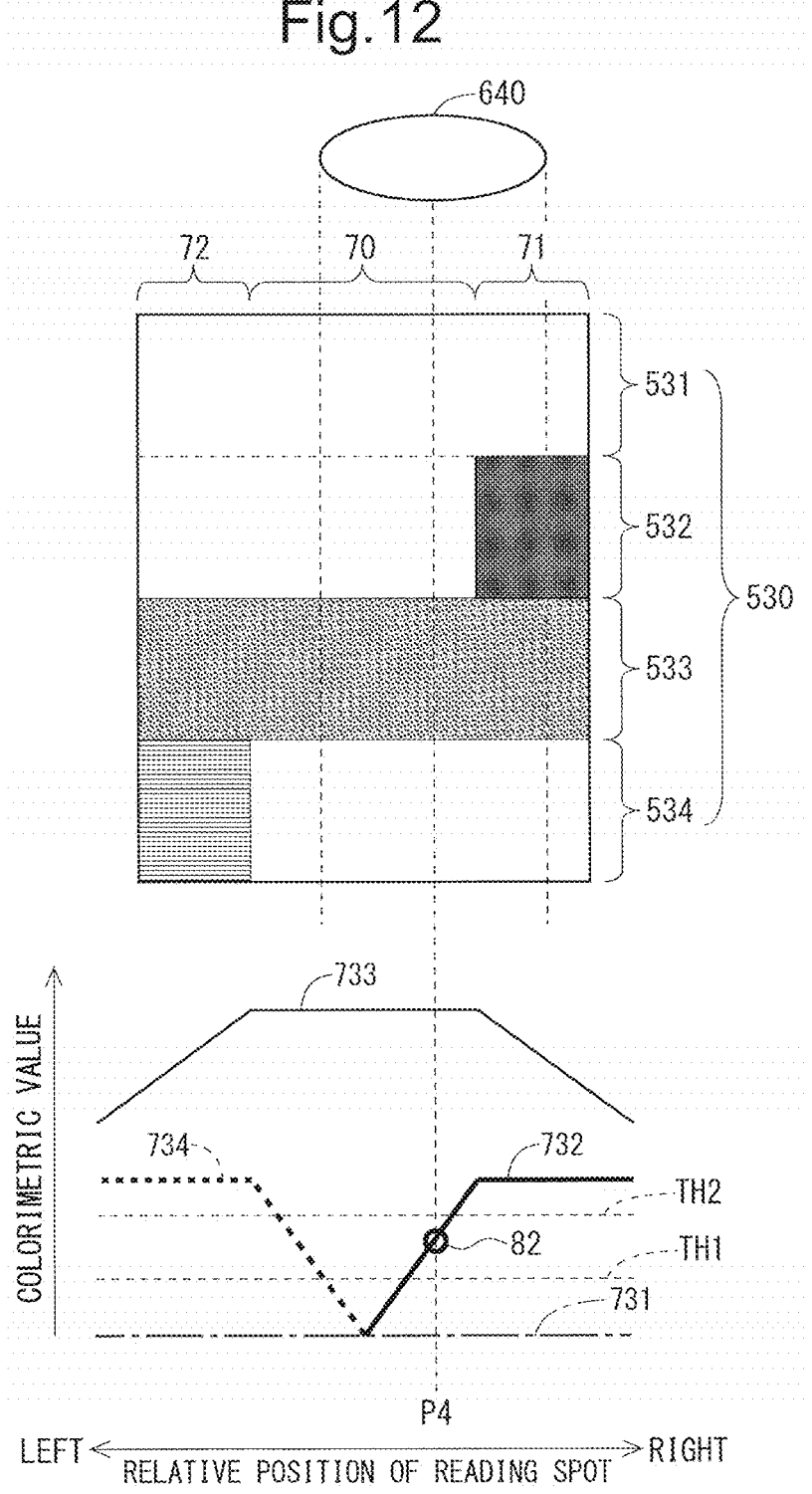
FIG. 12 is a diagram for explaining a relationship between a position of a reading spot of a colorimeter and a colorimetric value obtained by colorimetry in the embodiment.

FIG. 12 is a diagram schematically illustrating a positional relationship between the reading spot 640 and the positional displacement detection chart 530 when the relative position of the reading spot 640 is displaced to the right from the state illustrated in FIG. 11. A position denoted by reference sign P4 in FIG. 12 is a relative position of the reading spot 640 at this time. At this time, a portion included in the colorimetric range in the right end region 71 is larger than that in the state illustrated in FIG. 11. Therefore, the colorimetric value obtained by the colorimetry of the first positional displacement detection patch 532 is higher than that in the state illustrated in FIG. 11. In this example, a colorimetric value corresponding to a portion denoted by reference sign 82 is obtained, and the colorimetric value is higher than the threshold value TH1. In the present embodiment, when the colorimetric value obtained by the colorimetry of the first positional displacement detection patch 532 or the colorimetry of the second positional displacement detection patch 534 becomes higher than the threshold value TH1, the processing of adjusting the position of the colorimeter 64 is performed. Specifically, the colorimeter movement mechanism 641 moves the colorimeter 64 based on the control by the colorimeter movement control unit 354 such that the positional relationship between the colorimeter 64 and the color chart 53 becomes an ideal positional relationship. Note that, although a threshold value TH2 higher than the threshold value TH1 is also provided, the threshold value TH2 will be described later.

Figure 13:
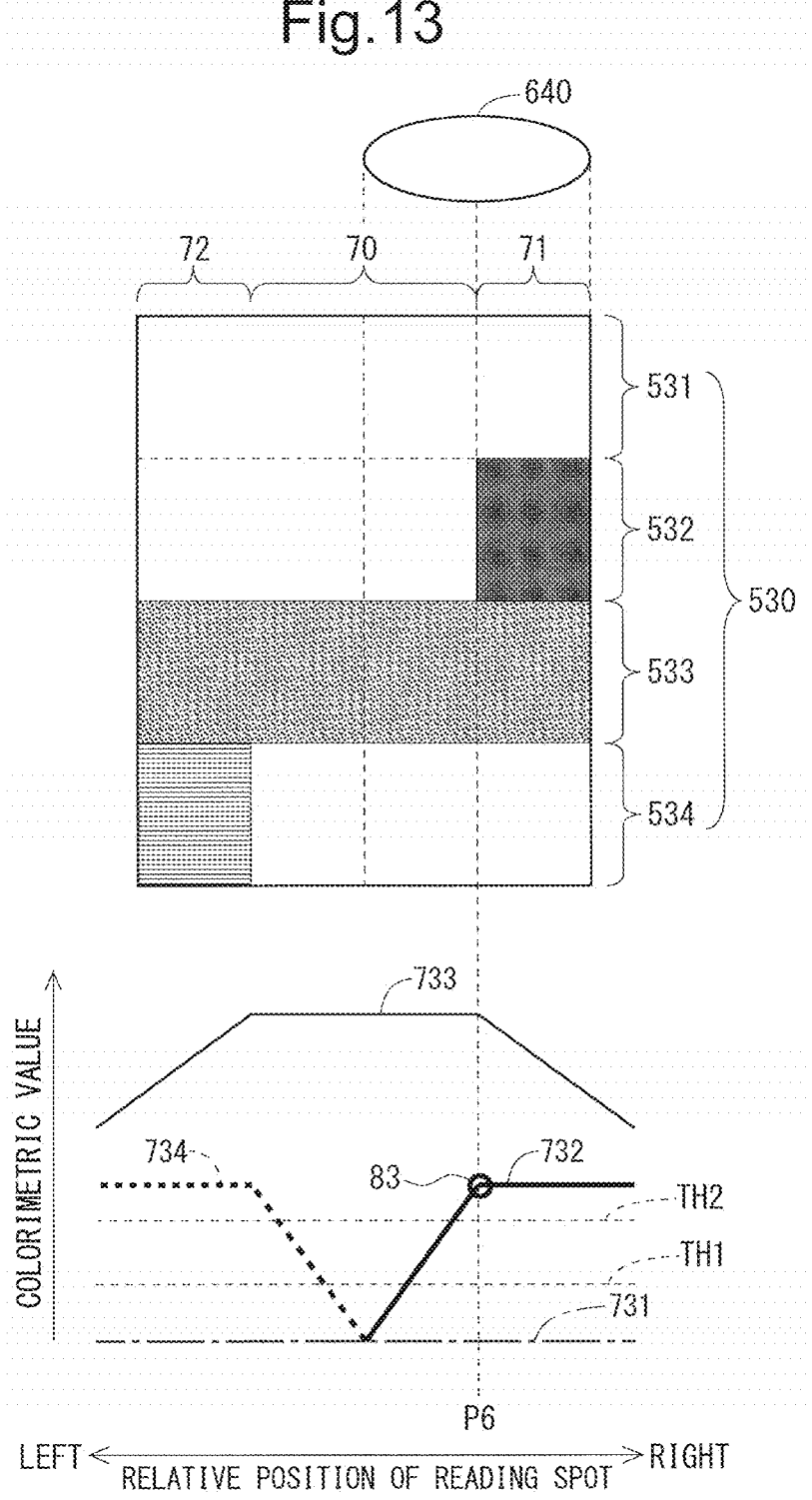
FIG. 13 is a diagram for explaining a relationship between a position of a reading spot of a colorimeter and a colorimetric value obtained by colorimetry in the embodiment.

FIG. 13 is a diagram schematically illustrating a positional relationship between the reading spot 640 and the positional displacement detection chart 530 when the relative position of the reading spot 640 is further displaced to the right from the state illustrated in FIG. 12 and reaches the boundary between the central region 70 and the right end region 71. A position denoted by reference sign P6 in FIG. 13 is a relative position of the reading spot 640 at this time. At this time, as can be grasped from FIG. 13, the entire right end region 71 is included in the colorimetric range. Since the entire right end region 71 of the first positional displacement detection patch 532 is painted in the first predetermined color, the colorimetric value obtained by the colorimetry of the first positional displacement detection patch 532 becomes the maximum value (see the portion denoted by reference sign 83). Since the colorimetric value is higher than the threshold value TH1, processing of adjusting the position of the colorimeter 64 is performed similarly to the state illustrated in FIG. 12.

Figure 14:
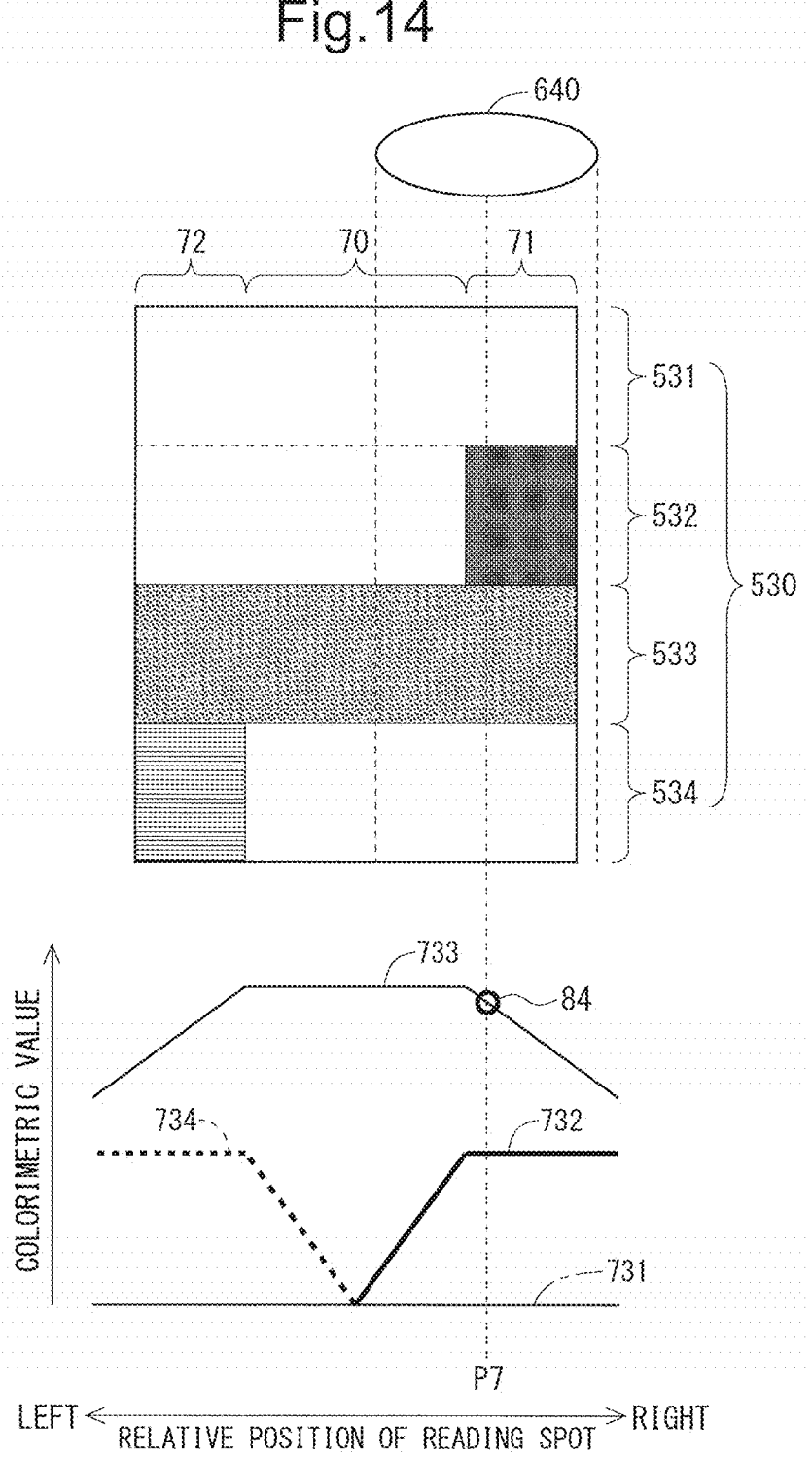
FIG. 14 is a diagram for explaining a relationship between a position of a reading spot of a colorimeter and a colorimetric value obtained by colorimetry in the embodiment.

FIG. 14 is a diagram schematically illustrating a positional relationship between the reading spot 640 and the positional displacement detection chart 530 when the relative position of the reading spot 640 is further displaced to the right from the state illustrated in FIG. 13. A position denoted by reference sign P7 in FIG. 14 is a relative position of the reading spot 640 at this time. The state illustrated in FIG. 14 may occur due to, for example, rapid positional displacement of the printing paper 5 immediately after the start of conveyance of the printing paper 5 or immediately after a change in printing speed. At this time, as can be grasped from FIG. 14, a region outside the positional displacement detection chart 530 is included in the colorimetric range. Therefore, the colorimetric value obtained as a result of the colorimetry of the reference patch 533 is a value lower than the maximum value. That is, under this state, even if the colorimetry of the normal colorimetric chart 539 is performed, a correct colorimetric result cannot be obtained. Therefore, in such a case, in the present embodiment, in addition to the processing of adjusting the position of the colorimeter 64 being performed, the colorimetric data obtained most recently is treated as invalid data.

Figure 15:
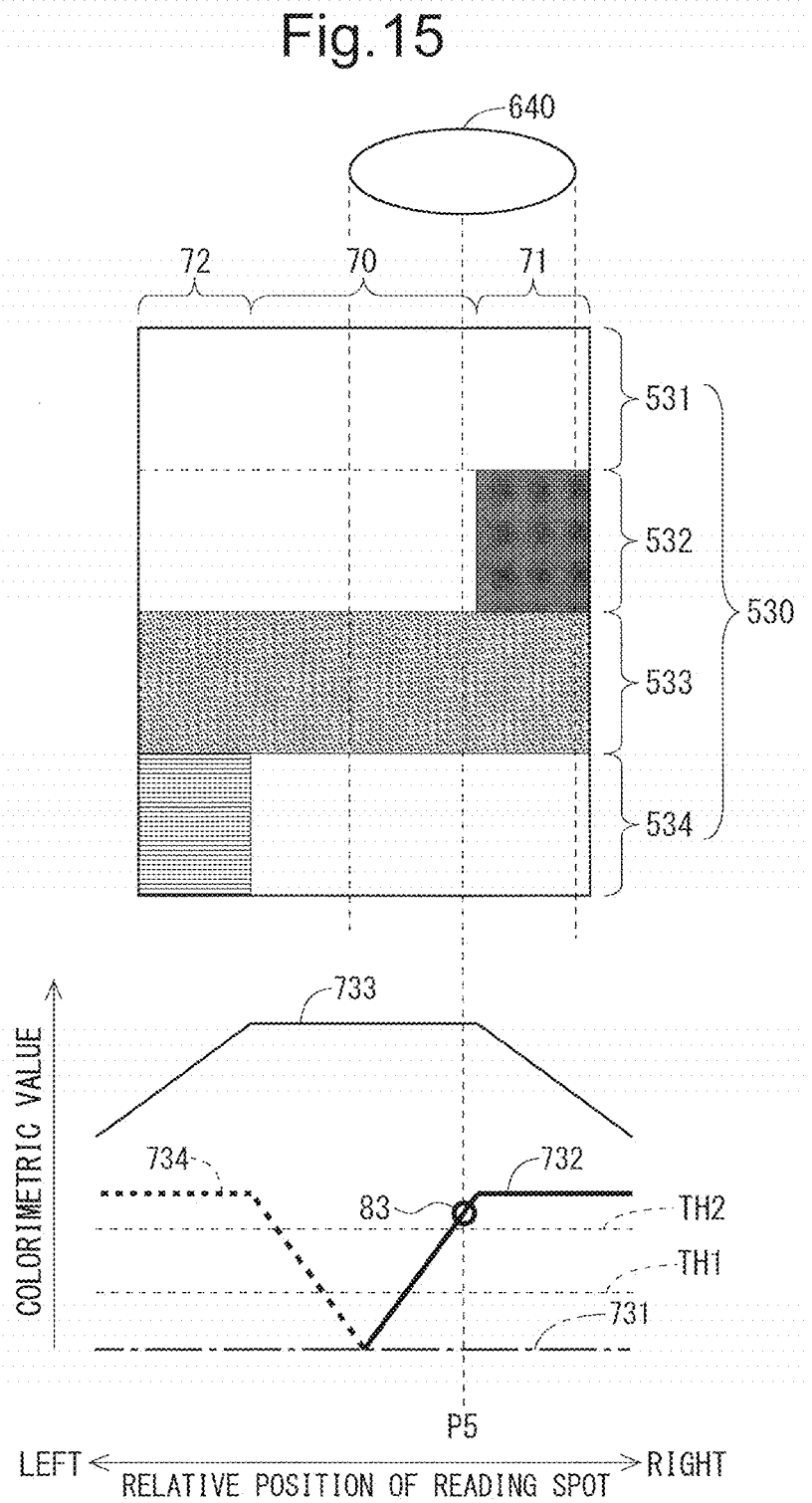
FIG. 15 is a diagram for explaining a relationship between a position of a reading spot of a colorimeter and a colorimetric value obtained by colorimetry in the embodiment.

By the way, although correct colorimetric results are obtained under the state illustrated in FIG. 13, the colorimetric results at the time points before and after the time point at which the state illustrated in FIG. 13 occurs are not necessarily correct results, due to the meandering of the printing paper 5. Therefore, when the colorimetric value obtained by the colorimetry of the first positional displacement detection patch 532 becomes larger than the predetermined threshold value TH2 as illustrated in FIG. 15, in addition to the processing of adjusting the position of the colorimeter 64 being performed, the colorimetric data obtained after the most recent time point at which the colorimetric value less than or equal to the threshold value TH2 is detected is treated as invalid data. Note that, in the state illustrated in FIG. 15, the position denoted by reference sign P5 is the relative position of the reading spot 640, and the colorimetric value corresponding to the portion denoted by reference sign 83 is obtained as a result of the colorimetry of the first positional displacement detection patch 532.

Figure 16:
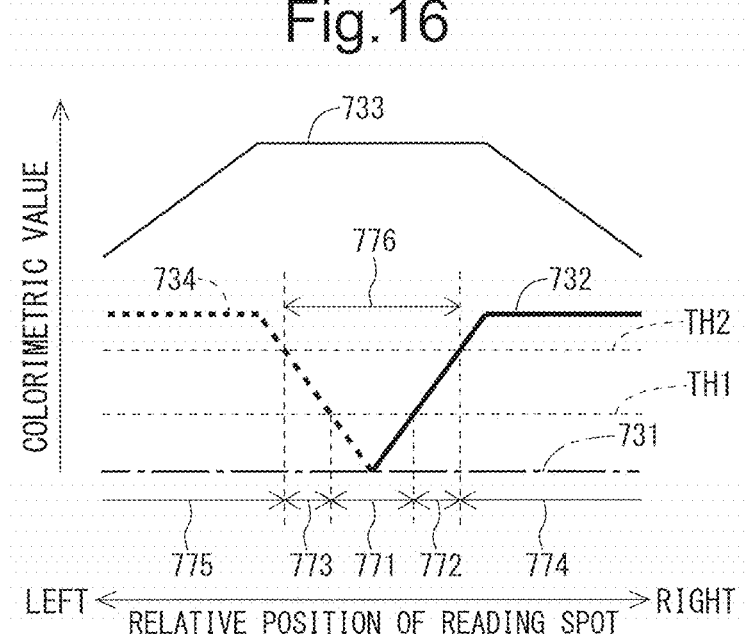
FIG. 16 is a diagram for explaining how the positional displacement is handled depending on the relative position of the reading spot in the embodiment.

From the above, handling of the positional displacement is performed as follows depending on the relative position of the reading spot 640 (see FIG. 16). When the relative position of the reading spot 640 is within a range indicated by an arrow denoted by reference sign 771 in FIG. 16, no handling of the positional displacement is performed. When the relative position of the reading spot 640 is within a range indicated by an arrow denoted by reference sign 772 in FIG. 16 or a range indicated by an arrow denoted by reference sign 773 in FIG. 16, processing of adjusting the position of the colorimeter 64 (processing of moving the colorimeter 64 so as to obtain a correct colorimetric result) is performed. When the relative position of the reading spot 640 is within a range indicated by an arrow denoted by reference sign 774 in FIG. 16 or a range indicated by an arrow denoted by reference sign 775 in FIG. 16, in addition to the processing of adjusting the position of the colorimeter 64 being performed, colorimetric data obtained after the most recent time point at which the relative position of the reading spot 640 was within a range indicated by an arrow denoted by reference sign 776 in FIG. 16 is treated as invalid data. At this time, for example, a message indicating that the colorimetric data obtained most recently is treated as invalid data because a significantly large positional displacement is detected is displayed on the display unit 123 of the print control device 100.

In the present embodiment, after all, the handling of the positional displacement is determined depending on the magnitude relationship between the colorimetric value obtained by performing the colorimetry of the first positional displacement detection patch 532 and the threshold values TH1 and TH2 and the magnitude relationship between the colorimetric value obtained by performing the colorimetry of the second positional displacement detection patch 534 and the threshold values TH1 and TH2. In this regard, the handling of the positional displacement may be determined in consideration of the colorimetric value obtained by performing the colorimetry of the reference patch 533. Furthermore, the handling of the positional displacement may be determined in consideration of a difference between the colorimetric value obtained by performing the colorimetry of the paper white patch 531 and the colorimetric value obtained by performing the colorimetry of the first positional displacement detection patch 532 and a difference between the colorimetric value obtained by performing the colorimetry of the paper white patch 531 and the colorimetric value obtained by performing the colorimetry of the second positional displacement detection patch 534.

Figures 17, 18:
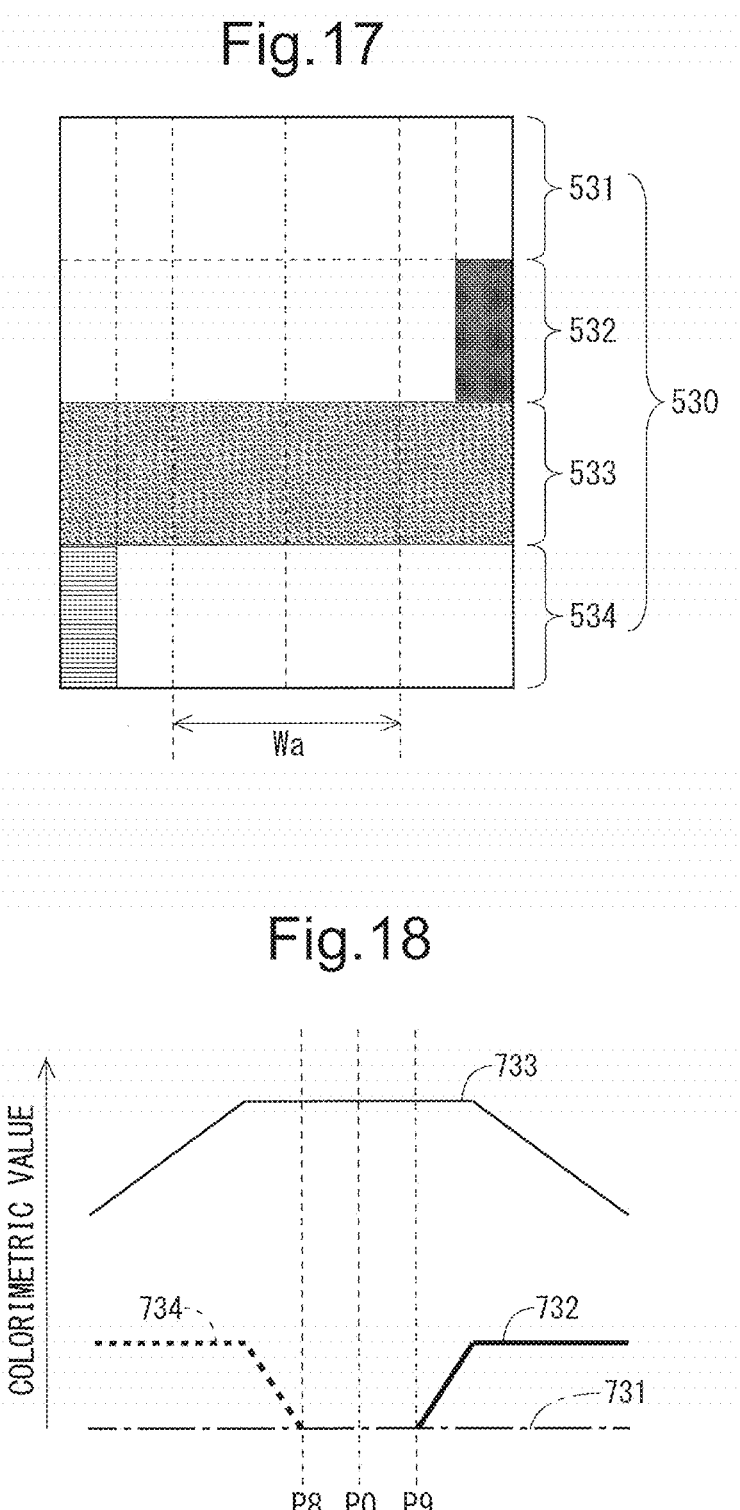
FIG. 17 is a diagram illustrating another example of the displacement detection chart in the positional embodiment.
FIG. 18 is a diagram illustrating a relationship between the relative position of the reading spot of the colorimeter and the colorimetric value obtained by colorimetry of each patch included in the positional displacement detection chart in a case where the positional displacement detection chart illustrated in FIG. 17 is adopted in the embodiment.

By the way, in a case where the positional displacement detection chart 530 illustrated in FIG. 8 is adopted, when the relative position of the reading spot 640 is slightly displaced from the ideal position, the first predetermined color included in the first positional displacement detection patch 532 or the second predetermined color included in the second positional displacement detection patch 534 is detected by colorimetry by the colorimeter 64. However, the present invention is not limited thereto. For example, the positional displacement detection chart 530 as illustrated in FIG. 17 can also be adopted. In this case, the relationship between the relative position of the reading spot 640 and the colorimetric value obtained by colorimetry of each patch included in the positional displacement detection chart 530 is as illustrated in FIG. 18. When the relative position of the reading spot 640 is between P8 and P9, neither the first predetermined color included in the first positional displacement detection patch 532 nor the second predetermined color included in the second positional displacement detection patch 534 is detected by colorimetry by the colorimeter 64.

<4.4 Calculation of Positional Displacement Amount>

Figure 19:
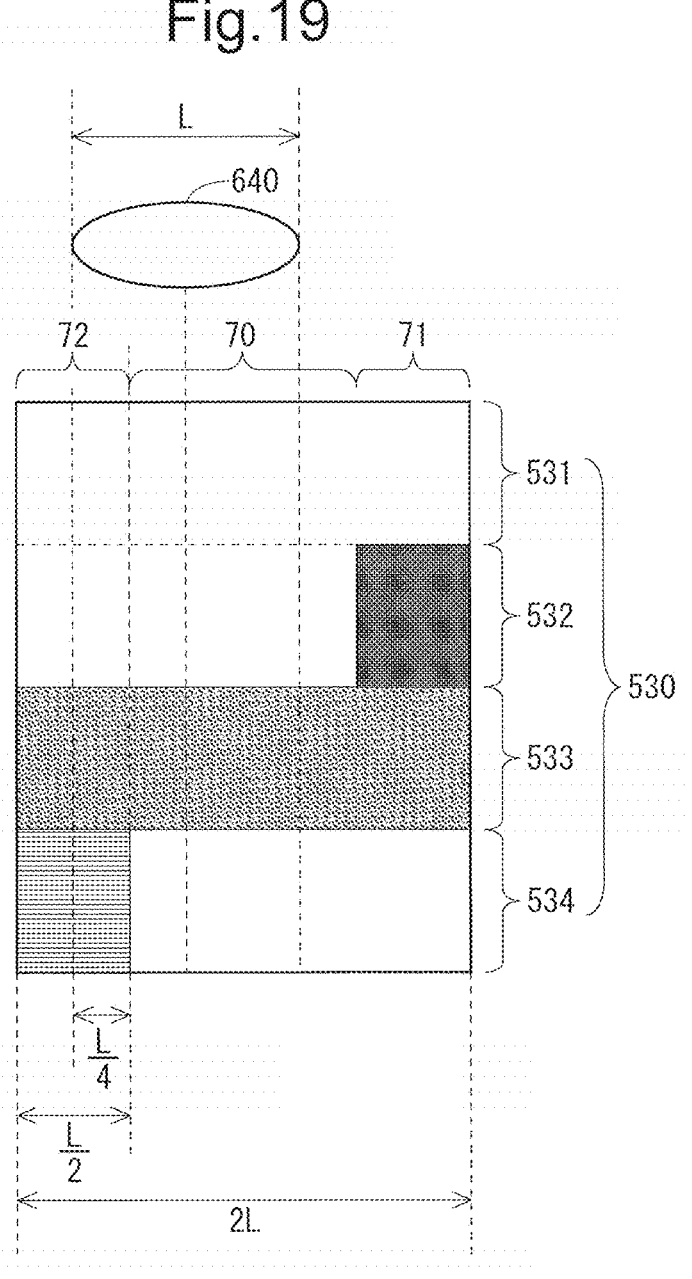
FIG. 19 is a diagram for explaining calculation of a positional displacement amount in the embodiment.

How the positional displacement is handled is determined based on the positional displacement amount calculated from the colorimetric result. How to calculate the positional displacement amount from the colorimetric result will be described with reference to FIG. 19. Here, it is assumed that the length of the reading spot 640 in the paper width direction is L, and the width (length in the paper width direction) of the positional displacement detection chart 530 is 2 L. Furthermore, it is assumed that the colorimetric value takes a value in a range from 0 (minimum value) to 1 (maximum value). Under the above assumption, a case where the relative position of the reading spot 640 is displaced leftward by L/4 from the ideal position (That is, a case where the positional displacement amount to be calculated is L/4) is assumed.

In this case, half of the left end region 72 is included in the colorimetric range. That is, regarding the left end region 72, a region having a length of L/4 in the paper width direction is included in the colorimetric range. Furthermore, the length of the reading spot 640 in the paper width direction is L. From the above, the colorimetric value of the second predetermined color obtained by the colorimetry of the second positional displacement detection patch 534 is 0.25.

Assuming that the colorimetric value of the second predetermined color is Z, the positional displacement amount X is calculated by the following Formula (1).

$$X = Z \times L \quad (1)$$

In the above case, since the colorimetric value of the second predetermined color is 0.25, the positional displacement amount X becomes L/4 by substituting 0.25 for Z in the above Formula (1). In this manner, the positional displacement amount (the magnitude of displacement from the ideal position of the printing paper 5 in the paper width direction) is calculated from the colorimetric result.

<4.5 Processing Procedure>

FIG. 20 is a flowchart illustrating a procedure of a series of processing for position adjustment of the colorimeter 64 (a procedure of a position adjustment method for adjusting a positional relationship between the colorimeter 64 and the color chart 53). The series of processing is performed during the conveyance of the printing paper 5 by the conveyance mechanism 29, particularly during the printing processing based on the print job. In the present embodiment, the position of the colorimeter 64 is adjusted in real time so that a correct colorimetric result can be obtained by colorimetry by the colorimeter 64 even if the displacement of the printing paper 5 in the paper width direction increases by performing a large amount of printing after the position of the colorimeter 64 is once adjusted. The position adjustment of the colorimeter 64 in real time is realized by the procedure illustrated in FIG. 20. Note that processing such as printing of an image based on a print job, printing and colorimetry of the normal colorimetric chart 539, and drying of the printing paper 5 after printing is also performed, but here, only processing related to position adjustment of the colorimeter 64 is focused.

First, the positional displacement detection chart 530 is printed (step S10). More specifically, in step S10, the positional displacement detection chart 530 is recorded on the printing paper 5 by ejecting ink from the ink ejection head constituting the recording unit 223. Next, colorimetry of the positional displacement detection chart 530 by the colorimeter 64 is performed (step S20). Colorimetric data obtained by colorimetry is sent to the print control device 100. Then, in the print control device 100, the positional displacement amount calculation unit 352 in the control unit 300 calculates the above-described positional displacement amount based on the colorimetric data obtained in step S20 (step S30).

Thereafter, the positional displacement amount calculation unit 352 determines whether or not adjustment of the position of the colorimeter 64 is necessary on the basis of the positional displacement amount calculated in step S30 (step S40). In step S40, the positional displacement amount is compared with the first threshold value corresponding to the threshold value TH1 and the second threshold value corresponding to the threshold value TH2, and when the positional displacement amount is larger than the first threshold value, it is determined that the adjustment of the position of the colorimeter 64 is necessary. As a result of the determination in step S40, if the position of the colorimeter 64 needs to be adjusted, the process proceeds to step S50, and if the position of the colorimeter 64 does not need to be adjusted, the process returns to step S10.

In step S50, the colorimeter movement control unit 354 in the control unit 300 controls the operation of the colorimeter movement mechanism 641 based on the positional displacement amount calculated in step S30, whereby the colorimeter 64 moves. That is, the colorimeter 64 moves by a distance equal to the positional displacement amount so as to eliminate the positional displacement. Note that, when the positional displacement amount is larger than the second threshold, the colorimetric data obtained after the most recent time point at which the positional displacement amount less than or equal to the second threshold is detected is treated as invalid data.

After the movement of the colorimeter 64, it is determined whether or not to end printing (step S60). As a result, when printing is terminated, a series of processing for position adjustment of the colorimeter 64 is also terminated, and when printing is not terminated, the process returns to step S10.

Meanwhile, in step S50, the colorimeter 64 moves by a distance equal to the positional displacement amount, but the distance by which the colorimeter 64 is moved is not limited thereto. In order to avoid a rapid change in the position of the colorimeter 64, the colorimeter 64 may be moved by a distance corresponding to a value obtained by multiplying the positional displacement amount calculated in step S30 by a predetermined coefficient less than 1. In this case, a step of calculating the distance by which the colorimeter 64 is moved may be provided immediately before step S50.

Note that, in the present embodiment, a color chart record step is realized by step S10, a color chart read step is realized by step S20, a positional displacement amount calculation step is realized by step S30, and a position adjustment step is realized by step S50.

<4.6 Procedure for Setting Initial Position of Colorimeter>

Figure 21:
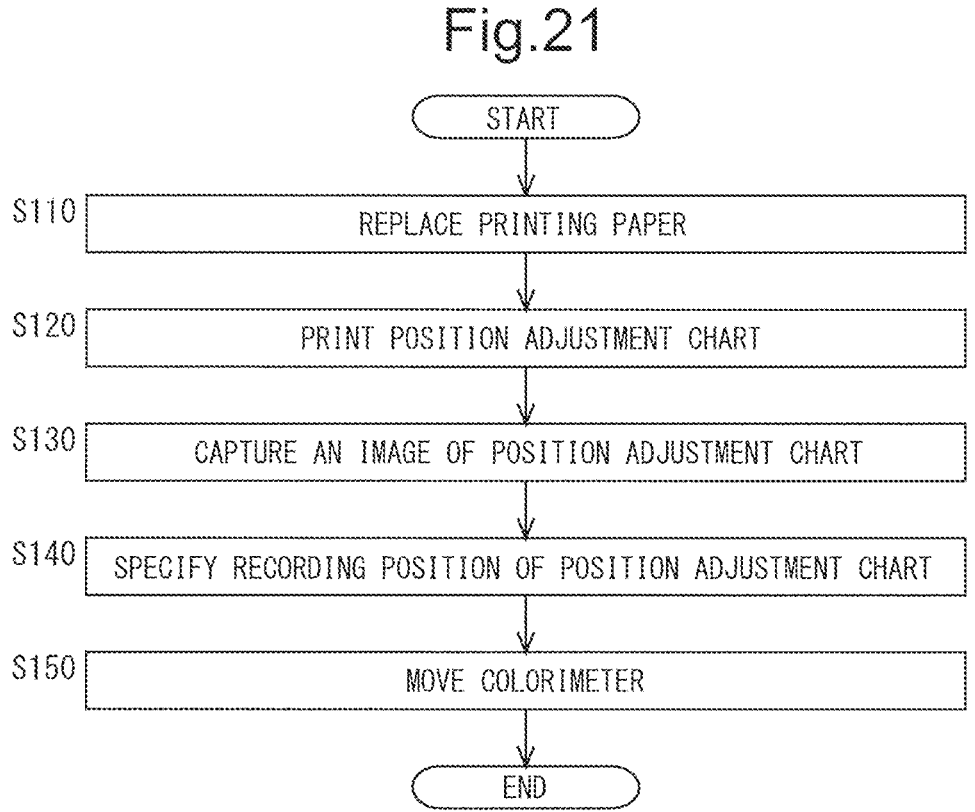
FIG. 21 is a flowchart for explaining a procedure for setting an initial position of the colorimeter in the embodiment.

In the inkjet printing apparatus 10 according to the present embodiment, the printing paper 5 of various sizes is used as a print medium. Furthermore, the color chart 53 is not printed at the same position on the printing paper 5 of all sizes. Therefore, in the present embodiment, the initial position of the colorimeter 64 is set each time the printing paper 5 is replaced. Hereinafter, a procedure for setting the initial position of the colorimeter 64 will be described with reference to a flowchart illustrated in FIG. 21. Note that here, it is assumed that printing paper 5 of various sizes is used as a print medium, but a print medium (for example, a film) other than the printing paper 5 may be used.

First, in a state where the operation of the inkjet printing apparatus 10 is stopped, the operator replaces the printing paper 5 (step S110). Next, a position adjustment chart for initial position setting of the colorimeter 64 is printed (step S120). More specifically, in step S120, the position adjustment chart is recorded on the printing paper 5 by ejecting ink from the ink ejection head constituting the recording unit 223. Note that the position adjustment chart is recorded at a position where the color chart 53 should be actually recorded on the printing paper 5. After the drying mechanism 224 dries the printing paper 5 on which the position adjustment chart has been recorded, the in-line scanner 65 captures an image of the position adjustment chart (step S130). Thereafter, the recording position of the position adjustment chart is specified based on the imaging data obtained in step S130 (step S140). The recording position specified in step S140 is displayed on the display unit 123 of the print control device 100, for example. Then, the operator inputs an instruction to the print control device 100 so that the colorimeter 64 moves to a desired position with reference to the specified recording position. As a result, the colorimeter 64 moves to a desired position (step S150).

In the present embodiment, when the printing paper 5 is replaced (that is, when step S110 is executed), the processing of steps S120 to S150 is executed before the processing of steps S10 to S60 illustrated in FIG. 20 is executed.

Note that, in the present embodiment, a print medium replacement step is realized by step S110, a position adjustment chart record step is realized by step S120, a position adjustment chart imaging step is realized by step S130, an initial position determination step is realized by step S140, and a colorimeter movement step is realized by step S150.

5. EFFECTS

According to the present embodiment, during the conveyance of the printing paper 5 by the conveyance mechanism 29, particularly during the printing processing based on the print job, the positional displacement detection chart 530 that can obtain a colorimetric result depending on the positional relationship between the colorimeter 64 and the color chart 53 is recorded, for example, in the margin portion of the printing paper 5. The inkjet printing apparatus 10 is provided with the positional displacement amount calculation unit 352 that calculates a positional displacement amount (magnitude of displacement from an ideal position of the printing paper 5 in the paper width direction) on the basis of the colorimetry result of the positional displacement detection chart 530, and the position of the colorimeter 64 in the paper width direction is adjusted on the basis of the positional displacement amount calculated by the positional displacement amount calculation unit 352. Therefore, even if the printing paper 5 is displaced in the paper width direction during conveyance of the printing paper 5, the positional relationship between the colorimeter 64 and the color chart 53 is maintained in a positional relationship in which a correct colorimetric result can be obtained. Furthermore, since the width of the positional displacement detection chart 530 is equal to the width of the normal colorimetric chart 539, by recording the positional displacement detection chart 530 in the margin portion of the printing paper 5, the region for the image based on the actual print job is not narrowed as compared with the conventional case. Moreover, it is not necessary to complicate the structure of the conveyance path of the printing paper 5 in order to obtain a stable colorimetric result. From the above, according to the present embodiment, it is possible to maintain a favorable positional relationship with respect to the positional relationship between the color chart 53 and the colorimeter 64 even when a large amount of printing is performed, while securing a region having a sufficient size for an image based on an actual print job. Furthermore, since the execution of printing using abnormal colorimetric data is suppressed, the necessity of reprinting is reduced as compared with the related art, and the consumption amount of the printing paper 5 and the ink can be reduced. In this way, it is possible to contribute to the achievement of the SDGs (sustainable development goals).

6. MODIFICATIONS

Hereinafter, modifications of the above embodiment will be described.

<6.1 Modification Regarding Positional Displacement Detection Chart>

Although the positional displacement detection chart 530 having the configuration illustrated in FIG. 8 is used in the above embodiment, the present invention is not limited thereto. Three modifications (first to third modifications) related to the positional displacement detection chart will be described below.

6.1.1 First Modification

Figure 22:
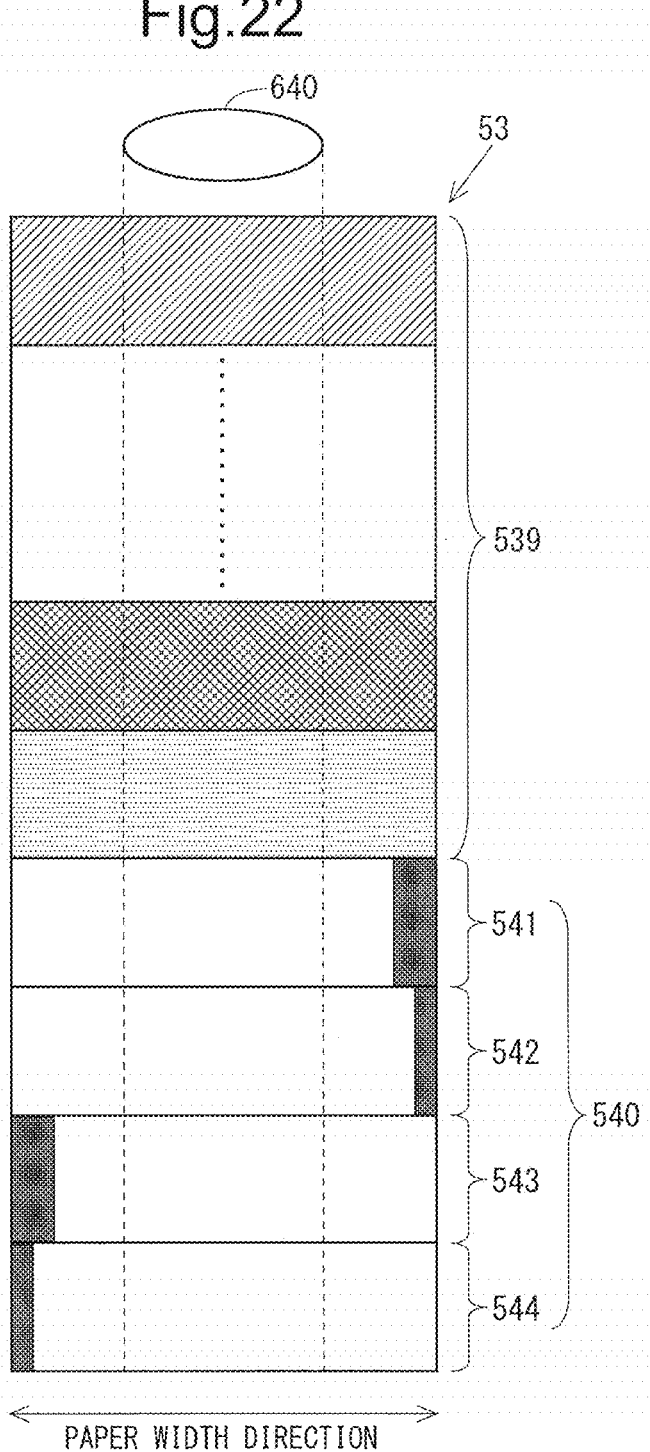
FIG. 22 is a diagram schematically illustrating a positional displacement detection chart according to a first modification of the embodiment.

FIG. 22 is a diagram for explaining a positional displacement detection chart 540 in the present modification. As illustrated in FIG. 22, the positional displacement detection chart 540 in the present modification includes two patches (Hereinafter, they are referred to as a "first one end side positional displacement detection patch" and a "second one end side positional displacement detection patch".) 541 and 542 in which only a region near one end side in the paper width direction is painted with a predetermined color, and two patches (Hereinafter, they are referred to as a "first other end side positional displacement detection patch" and a "second other end side positional displacement detection patch".) 543 and 544 in which only a region near the other end side in the paper width direction is painted with a predetermined color. Note that the same color is painted to all of the first one end side positional displacement detection patch 541, the second one end side positional displacement detection patch 542, the first other end side positional displacement detection patch 543, and the second other end side positional displacement detection patch 544. However, different colors may be painted to the four patches. The region where the predetermined color is painted in the second one end side positional displacement detection patch 542 is smaller than the region where the predetermined color is painted in the first one end side positional displacement detection patch 541. Similarly, the region where the predetermined color is painted in the second other end side positional displacement detection patch 544 is smaller than the region where the predetermined color is painted in the first other end side positional displacement detection patch 543. The size of the region where the predetermined color is painted in the first one end side positional displacement detection patch 541 is equal to the size of the region where the predetermined color is painted in the first other end side positional displacement detection patch 543, and the size of the region where the predetermined color is painted in the second one end side positional displacement detection patch 542 is equal to the size of the region where the predetermined color is painted in the second other end side positional displacement detection patch 544.

As above, the positional displacement detection chart 540 according to the present modification includes the first one end side positional displacement detection patch 541 in which only a region that is a region of the first size on one end side in the paper width direction and is outside the colorimetric range of the colorimeter 64 when the positional relationship between the colorimeter 64 and the color chart 53 is an ideal positional relationship is painted with a predetermined color, and the second one end side positional displacement detection patch 542 in which only a region that is a region of the second size on one end side in the paper width direction and is outside the colorimetric range of the colorimeter 64 when the positional relationship between the colorimeter 64 and the color chart 53 is an ideal positional relationship is painted with a predetermined color, and a first other end side positional displacement detection patch 543 in which only a region that is a region of the first size on the other end side in the paper width direction and is outside the colorimetric range of the colorimeter 64 when the positional relationship between the colorimeter 64 and the color chart 53 is an ideal positional relationship is painted with a predetermined color, and a second other end side positional displacement detection patch 544 in which only a region that is a region of the second size on the other end side in the paper width direction and is outside the colorimetric range of the colorimeter 64 when the positional relationship between the colorimeter 64 and the color chart 53 is an ideal positional relationship is painted with a predetermined color. Note that the second size is smaller than the first size.

In the example illustrated in FIG. 22, the relative position of the reading spot 640 is at an ideal position. When the relative position of the reading spot 640 is at the ideal position or when the positional displacement amount is small, the predetermined color is not detected by the colorimetry of the first one end side positional displacement detection patch 541, the colorimetry of the second one end side positional displacement detection patch 542, the colorimetry of the first other end side positional displacement detection patch 543, and the colorimetry of the second other end side positional displacement detection patch 544. In such a case, in the present modification, no handling of the positional displacement is performed.

Figure 23:
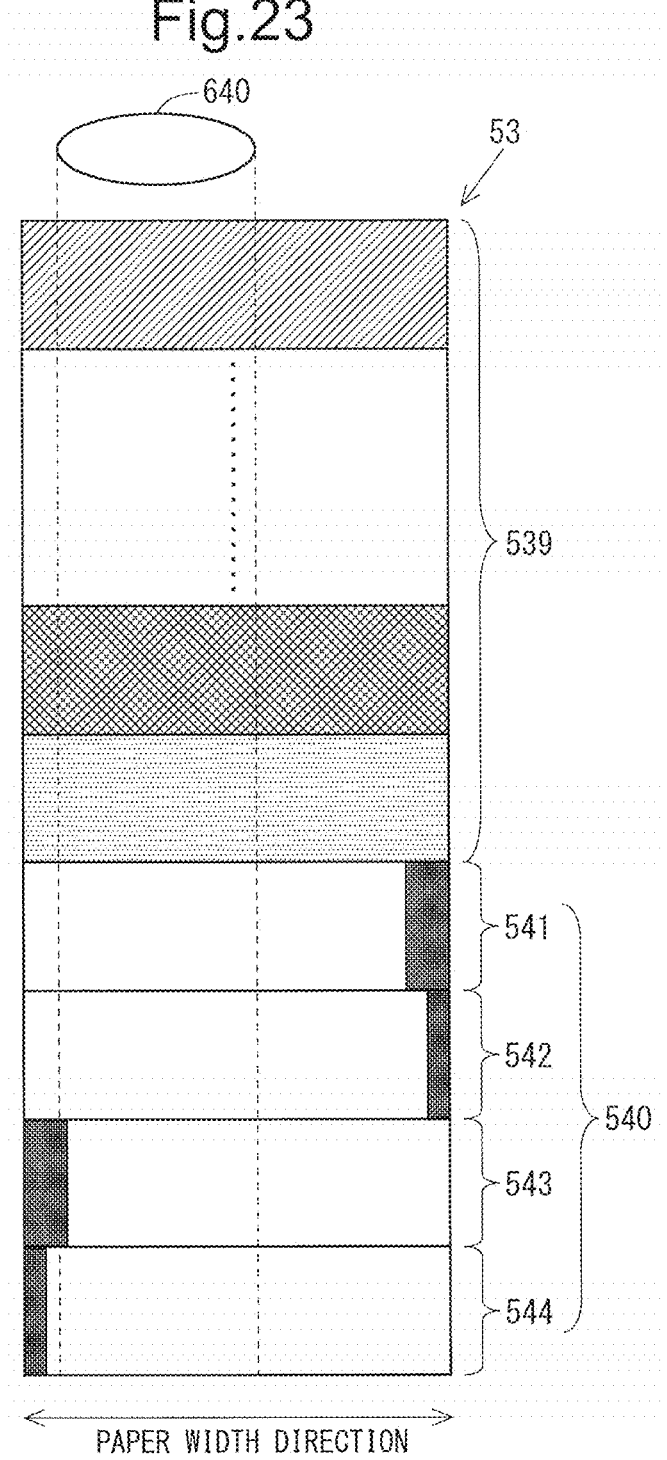
FIG. 23 is a diagram for explaining a relationship between a relative position of a reading spot and a colorimetric result in the first modification of the embodiment.

In the example illustrated in FIG. 23, the predetermined color is not detected by the colorimetry of the second other end side positional displacement detection patch 544, but the predetermined color is detected by the colorimetry of the first other end side positional displacement detection patch 543. In such a case, in the present modification, processing of adjusting the position of the colorimeter 64 based on the positional displacement amount is performed. Note that the same applies to a case where the predetermined color is not detected by colorimetry of the second one end side positional displacement detection patch 542, but the predetermined color is detected by colorimetry of the first one end side positional displacement detection patch 541.

Figure 24:
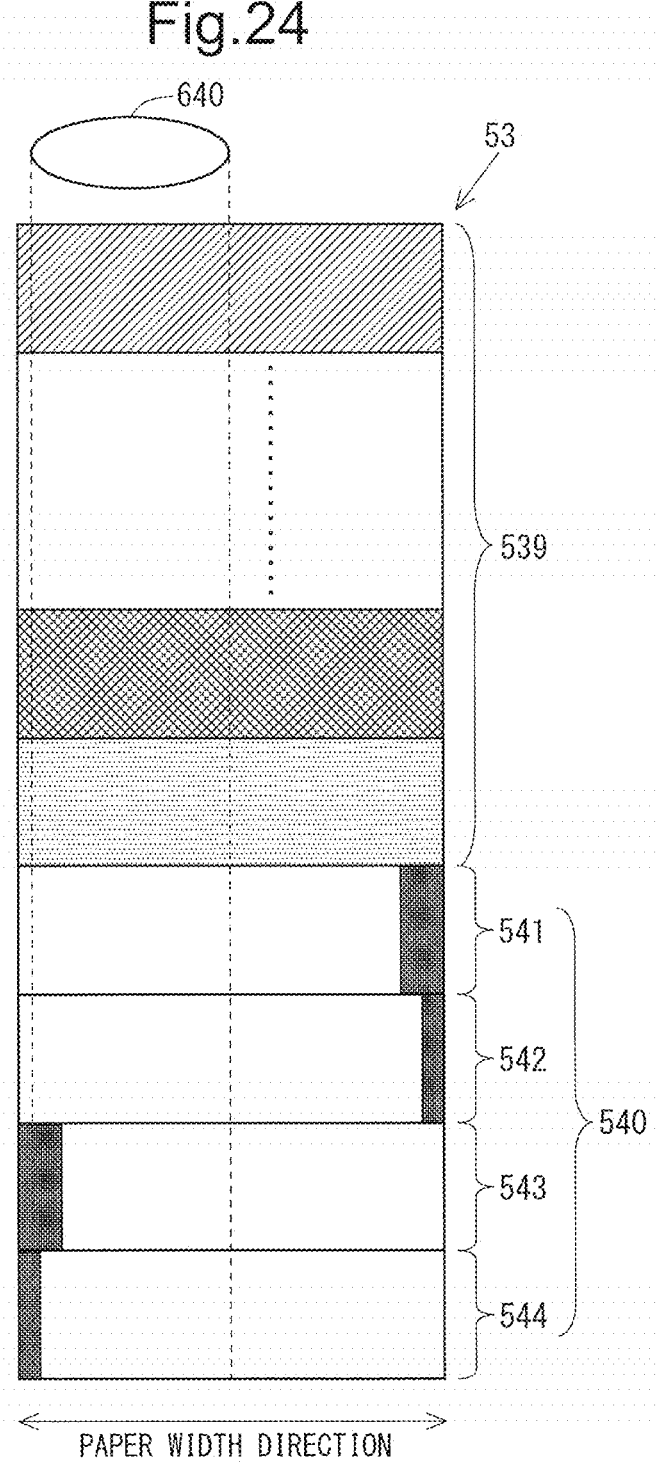
FIG. 24 is a diagram for explaining a relationship between a relative position of a reading spot and a colorimetric result in the first modification of the embodiment.
Figure 25:
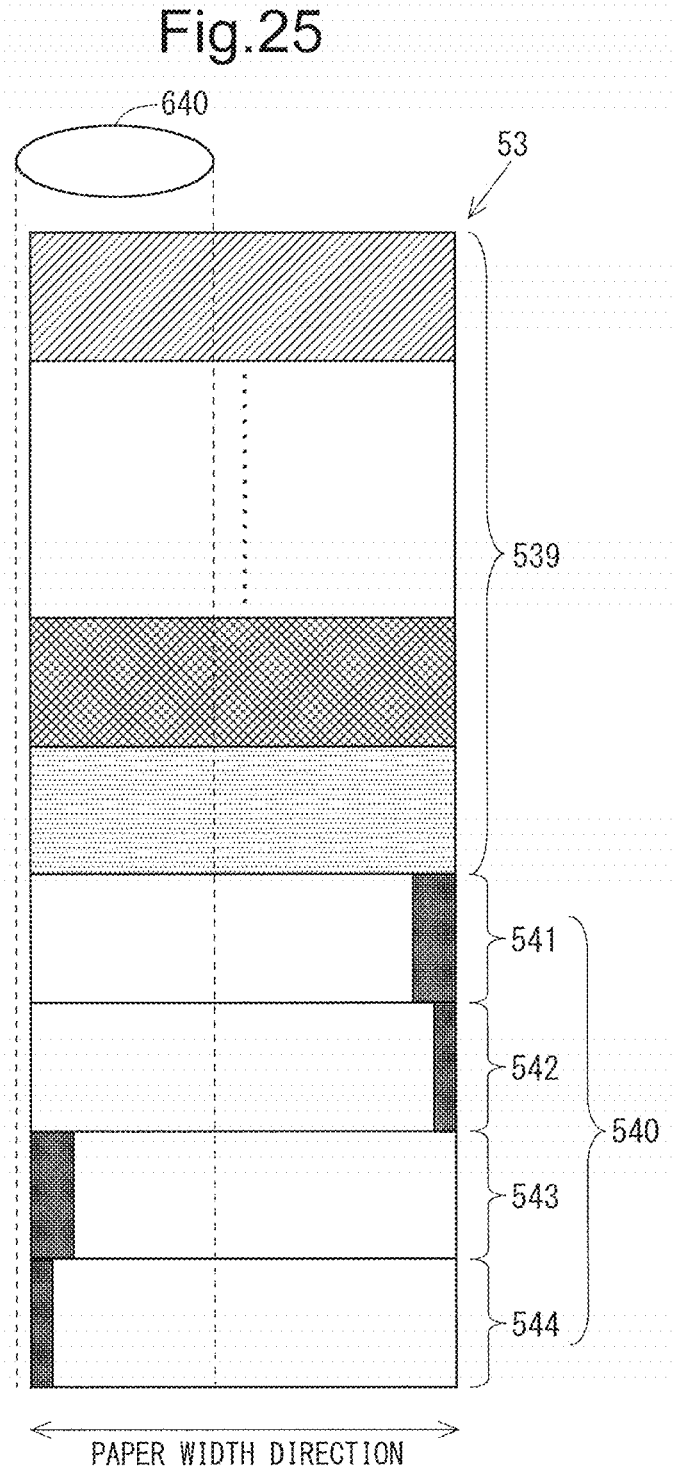
FIG. 25 is a diagram for explaining a relationship between a relative position of a reading spot and a colorimetric result in the first modification of the embodiment.

In the example illustrated FIG. 24, the predetermined color is detected by colorimetry of the second other end side positional displacement detection patch 544. In such a case, in the present modification, in addition to the processing of adjusting the position of the colorimeter 64 based on the positional displacement amount being performed, the colorimetric data obtained after the most recent time point at which both the predetermined color included in the second one end side positional displacement detection patch 542 and the predetermined color included in the second other end side positional displacement detection patch 544 were not detected is treated as invalid data. Note that the same applies to a case where the predetermined color is detected by colorimetry of the second one end side positional displacement detection patch 542. By the way, although correct colorimetric results can be obtained under the state illustrated in FIG. 24, due to the meandering of the printing paper 5, there is a possibility that the state illustrated in FIG. 25 occurs at before and after the time when the state illustrated in FIG. 24 occurs. In the state illustrated in FIG. 25, since the region outside the positional displacement detection chart 540 is included in the colorimetric range, a correct colorimetric result cannot be obtained. Therefore, when the state illustrated in FIG. 24 occurs, the colorimetric data is treated as invalid data as described above.

Figure 26:
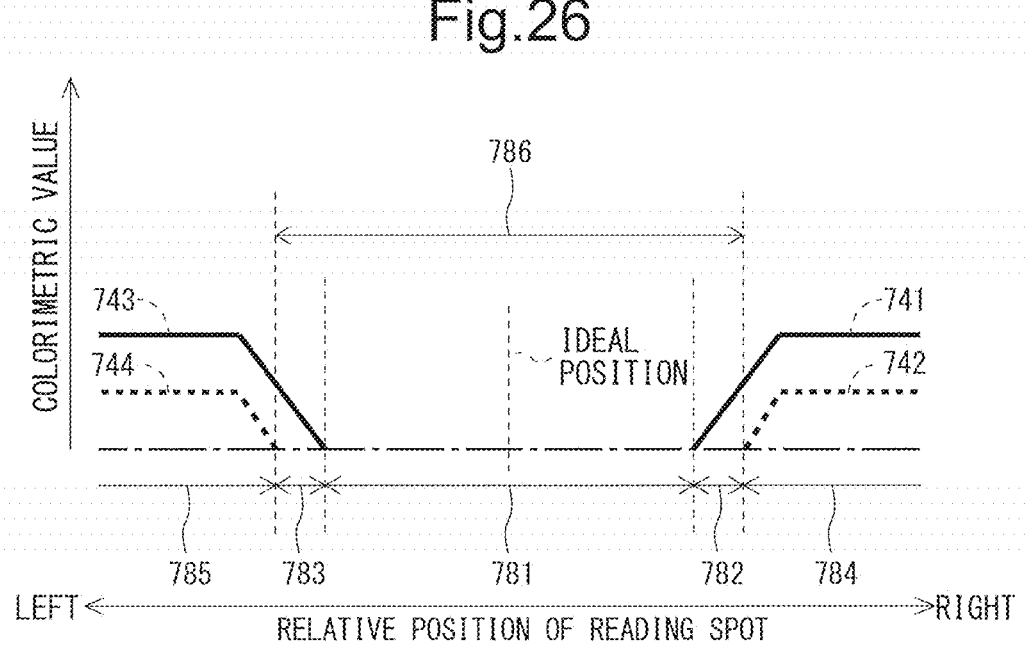
FIG. 26 is a diagram for explaining how the positional displacement is handled depending on the relative position of the reading spot in the first modification of the embodiment.

From the above, in the present modification, handling of the positional displacement is performed as follows depending on the relative position of the reading spot 640 (see FIG. 26). Note that, regarding FIG. 26, a thick solid line denoted by reference sign 741 represents a colorimetric value obtained by colorimetry of the first one end side positional displacement detection patch 541, a thick dotted line denoted by reference sign 742 represents a colorimetric value obtained by colorimetry of the second one end side positional displacement detection patch 542, a thick solid line denoted by reference sign 743 represents a colorimetric value obtained by colorimetry of the first other end side positional displacement detection patch 543, and a thick dotted line denoted by reference sign 744 represents a colorimetric value obtained by colorimetry of the second other end side positional displacement detection patch 544. When the relative position of the reading spot 640 is within a range indicated by an arrow denoted by reference sign 781 in FIG. 26, no handling of the positional displacement is performed. When the relative position of the reading spot 640 is within a range indicated by an arrow denoted by reference sign 782 in FIG. 26 or a range indicated by an arrow denoted by reference sign 783 in FIG. 26, processing of adjusting the position of the colorimeter 64 (processing of moving the colorimeter 64 so as to obtain a correct colorimetric result) is performed. When the relative position of the reading spot 640 is within a range indicated by an arrow denoted by reference sign 784 in FIG. 26 or a range indicated by an arrow denoted by reference sign 785 in FIG. 26, in addition to the processing of adjusting the position of the colorimeter 64 being performed, colorimetric data obtained after the most recent time point at which the relative position of the reading spot 640 was within a range indicated by an arrow denoted by reference sign 786 in FIG. 26 is treated as invalid data.

6.1.2 Second Modification

Figure 27:
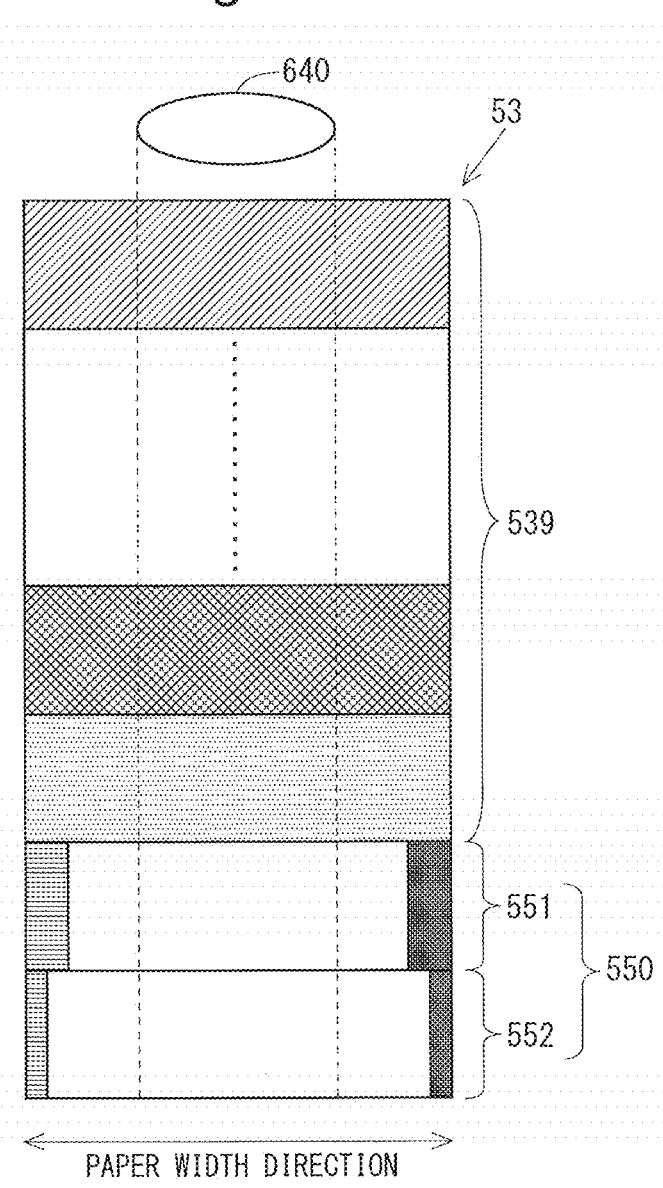
FIG. 27 is a diagram schematically illustrating a positional displacement detection chart according to a second modification of the embodiment.

FIG. 27 is a diagram for explaining a positional displacement detection chart 550 in the present modification. As illustrated in FIG. 27, the positional displacement detection chart 550 in the present modification includes two patches (Hereinafter, they are referred to as a "first both end side positional displacement detection patch" and a "second both end side positional displacement detection patch".) 551 and 552 in which a region in the vicinity of one end side in the paper width direction is painted with a predetermined color (Hereinafter, the color is referred to as a "first predetermined color".), and a region in the vicinity of the other end side in the paper width direction is painted with a predetermined color (Hereinafter, the color is referred to as a "second predetermined color".) different from the first predetermined color. The region where the first predetermined color and the second predetermined color are painted in the second both end side positional displacement detection patch 552 is smaller than the region where the first predetermined color and the second predetermined color are painted in the first both end side positional displacement detection patch 551. The size of the region where the first predetermined color is painted in the first both end side positional displacement detection patch 551 is equal to the size of the region where the second predetermined color is painted in the first both end side positional displacement detection patch 551, and the size of the region where the first predetermined color is painted in the second both end side positional displacement detection patch 552 is equal to the size of the region where the second predetermined color is painted in the second both end side positional displacement detection patch 552.

As above, the positional displacement detection chart 540 according to the present modification includes: the first both end side positional displacement detection patch 551 in which only a region that is a region of the first size on one end side in the paper width direction and is outside the colorimetric range of the colorimeter 64 when the positional relationship between the colorimeter 64 and the color chart 53 is an ideal positional relationship is painted with a first predetermined color, and only a region that is a region of the first size on the other end side in the paper width direction and is outside the colorimetric range of the colorimeter 64 when the positional relationship between the colorimeter 64 and the color chart 53 is an ideal positional relationship is painted with a second predetermined color; and the second both end side positional displacement detection patch 552 in which only a region that is a region of the second size on one end side in the paper width direction and is outside the colorimetric range of the colorimeter 64 when the positional relationship between the colorimeter 64 and the color chart 53 is an ideal positional relationship is painted with a first predetermined color, and only a region that is a region of the second size on the other end side in the paper width direction and is outside the colorimetric range of the colorimeter 64 when the positional relationship between the colorimeter 64 and the color chart 53 is an ideal positional relationship is painted with a second predetermined color. Note that the second size is smaller than the first size.

In the present modification, handling of the positional displacement is performed as follows depending on the colorimetric result obtained by the colorimetry of the positional displacement detection chart 550 as described above. When neither the first predetermined color nor the second predetermined color is detected, no handling of the positional displacement is performed. When the first predetermined color is not detected by the colorimetry of the second both end side positional displacement detection patch 552 and the first predetermined color is detected by the colorimetry of the first both end side positional displacement detection patch 551, processing of adjusting the position of the colorimeter 64 (processing of moving the colorimeter 64 so as to obtain a correct colorimetric result) is performed. Similarly, when the second predetermined color is not detected by the colorimetry of the second both end side positional displacement detection patch 552 and the second predetermined color is detected by the colorimetry of the first both end side positional displacement detection patch 551, the processing of adjusting the position of the colorimeter 64 is also performed. When the first predetermined color or the second predetermined color is detected by the colorimetry of the second both end side positional displacement detection patch 552, in addition to the processing of adjusting the position of the colorimeter 64 being performed, the colorimetric data obtained after the most recent time point at which both the first predetermined color included in the second both end side positional displacement detection patch and 552 the second predetermined color included in the second both end side positional displacement detection patch 552 were not detected is treated as invalid data.

6.1.3 Third Modification

Figure 28:
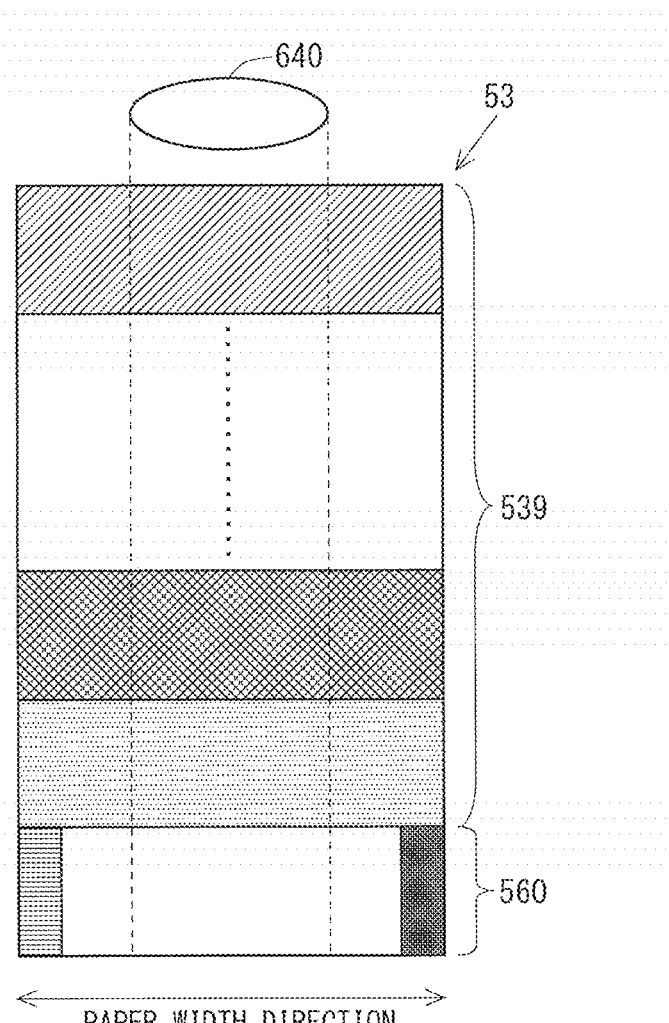
FIG. 28 is a diagram schematically illustrating a positional displacement detection chart according to a third modification of the embodiment.

FIG. 28 is a diagram for explaining a positional displacement detection chart 560 in the present modification. As illustrated in FIG. 28, the positional displacement detection chart 550 according to the present modification includes only one patch in which a region near one end side in the paper width direction is painted with a predetermined color (Hereinafter, the color is referred to as a "first predetermined color".), and a region near the other end side in the paper width direction is painted with a predetermined color (Hereinafter, the color is referred to as a "second predetermined color".) different from the first predetermined color. A positional displacement detection patch is realized by this one patch. Note that the size of the region where the first predetermined color is painted is equal to the size of the region where the second predetermined color is painted.

As above, the positional displacement detection chart 560 in the present modification includes a patch (positional displacement detection patch) in which only a region that is on one end side in the paper width direction and is outside the colorimetric range of the colorimeter 64 when the positional relationship between the colorimeter 64 and the color chart 53 is an ideal positional relationship is painted with the first predetermined color, and only a region that is on the other end side in the paper width direction and is outside the colorimetric range of the colorimeter 64 when the positional relationship between the colorimeter 64 and the color chart 53 is an ideal positional relationship is painted with the second predetermined color.

In the present modification, as in the above embodiment, two threshold values (first threshold value and second threshold value larger than the first threshold value) for displacement amount comparison with the positional corresponding to the colorimetric value of the first predetermined color and the positional displacement amount corresponding to the colorimetric value of the second predetermined color are prepared. Then, depending on the result of comparison between the positional displacement amount and the two thresholds, handling of the positional displacement is performed as follows. When the positional displacement amount is equal to or less than the first threshold value, no handling of the positional displacement is performed. When the positional displacement amount is larger than the first threshold value and equal to or smaller than the second threshold value, processing of adjusting the position of the colorimeter 64 (processing of moving the colorimeter 64 so as to obtain a correct colorimetric result) is performed. When the positional displacement amount is larger than the second threshold value, in addition to the processing of adjusting the position of the colorimeter 64 being performed, colorimetric data obtained after the most recent time point at which the positional displacement amount equal to or less than the second threshold value is detected is treated as invalid data.

6.1.4 Summary of Positional Displacement Detection Chart

Figure 29:
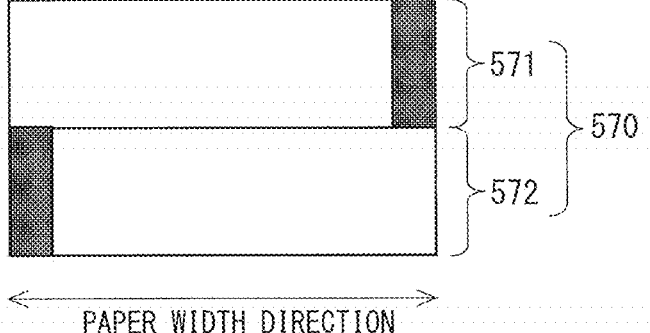
FIG. 29 is a diagram for explaining a positional displacement detection chart in a case where a positional amount is calculated on the basis of displacement colorimetric data regarding the embodiment and the first to third modifications.

To summarize the above embodiment and the first to third modifications, in the case of calculating the positional displacement amount based on the colorimetric data, the color chart 53 may include a positional displacement detection chart 570 as illustrated in FIG. 29 including a patch (Hereinafter, it is referred to as a "first positional displacement detection patch".) 571 in which only a region near one end side in the paper width direction is painted with a predetermined color and a patch (Hereinafter, it is referred to as a "second positional displacement detection patch".) 572 in which only a region near the other end side in the paper width direction is painted with a predetermined color or a positional displacement detection chart 560 as illustrated in FIG. 28. Note that, although the color included in the first positional displacement detection patch 571 and the color included in the second positional displacement detection patch 572 are illustrated to be the same color in FIG. 29, they may be different colors.

Thus, in a case where the positional displacement amount is calculated on the basis of the colorimetric data, the color chart 53 may include a positional displacement detection chart 570 including a first positional displacement detection patch 571 in which only a region that is on one end side in the paper width direction and is outside the colorimetric range of the colorimeter 64 when the positional relationship between the colorimeter 64 and the color chart 53 is an ideal positional relationship is painted with a predetermined color and a second positional displacement detection patch 572 in which only a region that is on the other end side in the paper width direction and is outside the colorimetric range of the colorimeter 64 when the positional relationship between the colorimeter 64 and the color chart 53 is an ideal positional relationship is painted with a predetermined color, or, a positional displacement detection chart 560 including a positional displacement detection patch in which only a region that is on one end side in the paper width direction and is outside the colorimetric range of the colorimeter 64 when the positional relationship between the colorimeter 64 and the color chart 53 is an ideal positional relationship is painted with a first predetermined color, and in which only a region that is on the other end side in the paper width direction and is outside the colorimetric range of the colorimeter 64 when the positional relationship between the colorimeter 64 and the color chart 53 is an ideal positional relationship is painted with a second predetermined color.

<6.2 Modification Regarding Calculation of Positional Displacement Amount>

Although the positional displacement amount is calculated based on the colorimetric data obtained by the colorimeter 64 performing the colorimetry of the positional displacement detection chart 530 in the above embodiment, the present invention is not limited thereto. Two modifications (a fourth modification and a fifth modification) related to the calculation of the positional displacement amount will be described below.

6.2.1 Fourth Modification

Figures 30, 31:
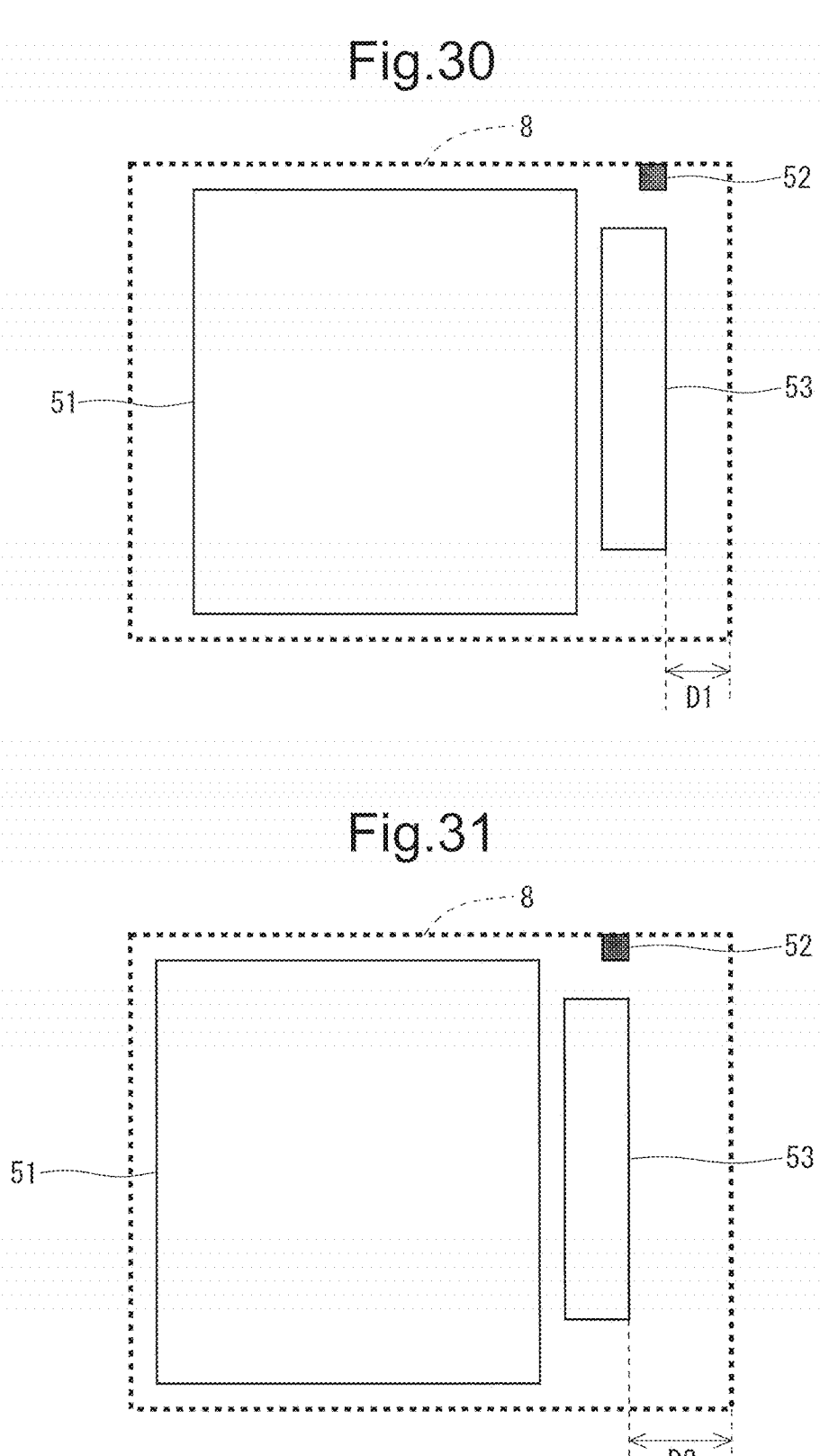
FIG. 30 is a diagram for explaining a method of calculating a positional displacement amount on the basis of imaging data in a fourth modification of the embodiment.
FIG. 31 is a diagram for explaining a method of calculating a positional displacement amount on the basis of imaging data in the fourth modification of the embodiment.

In the present modification, the positional displacement amount (the magnitude of displacement from the ideal position of the printing paper 5 in the paper width direction) is calculated on the basis of imaging data obtained by capturing the print image including the color chart 53 by the in-line scanner 65. In order to realize this, information regarding the position of the color chart 53 in the imaging area when the printing paper 5 is at the ideal position is held in advance. For example, information on the distance (D1 in FIG. 30) from the right end of the imaging area 8 to the right end of the color chart 53 is held in advance. Furthermore, information of the current position of the colorimeter 64 is also held.

Under the above assumption, the distance from the right end of the imaging area 8 to the right end of the color chart 53 is obtained on the basis of the imaging data obtained during the printing processing. Then, the positional displacement amount is calculated by obtaining the difference between the obtained distance and the distance held in advance, and the position of the colorimeter 64 is adjusted based on the positional displacement amount and the current position of the colorimeter 64. For example, in a case where the distance from the right end of the imaging area 8 to the right end of the color chart 53 is D2 in FIG. 31 based on the imaging data obtained during the printing processing, the difference between D2 and D1 is the positional displacement amount, and the position of the colorimeter 64 is adjusted based on the positional displacement amount and the current position of the colorimeter 64.

Note that, in the present modification, the positional displacement amount is not calculated based on the colorimetric data, and thus, it is not necessary to include the positional displacement detection chart 530 as illustrated in FIG. 8, for example, in the color chart 53.

Figure 32:
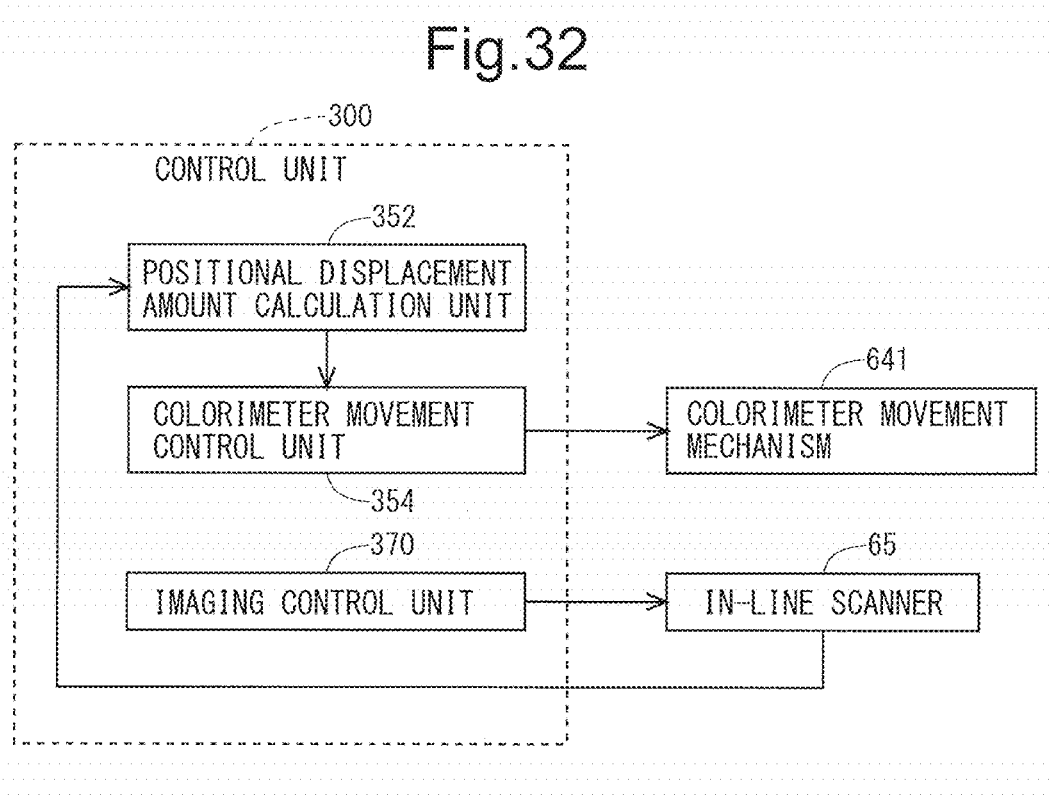
FIG. 32 is a block diagram illustrating a configuration related to position adjustment of a colorimeter in a fourth modification of the embodiment.

FIG. 32 is a block diagram illustrating a configuration in the present modification related to position adjustment of the colorimeter 64. As described above, in the present displacement amount is modification, the positional calculated on the basis of the imaging data obtained by the in-line scanner 65. As can be grasped from FIG. 32, the position of the colorimeter 64 is adjusted by the imaging control unit 370, the in-line scanner 65, the positional displacement amount calculation unit 352, the colorimeter movement control unit 354, and the colorimeter movement mechanism 641.

In the present modification, position adjustment of the colorimeter 64 is performed as follows. First, based on the control by the imaging control unit 370, the in-line scanner 65 captures a print image including the color chart 53 while the printing paper 5 is being conveyed. The imaging data obtained thereby is sent to the control unit 300. Then, the positional displacement amount calculation unit 352 calculates the positional displacement amount based on the imaging data while the printing paper 5 is being conveyed. Based on the positional displacement amount calculated by the positional displacement amount calculation unit 352 and the current position of the colorimeter 64, the colorimeter movement control unit 354 controls the operation of the colorimeter movement mechanism 641 during conveyance of the printing paper 5. As a result, the colorimeter 64 moves so that the colorimeter 64 correctly performs the colorimetry of the color chart 53.

As illustrated in FIGS. 2 and 3, the in-line scanner 65 is provided on the downstream side of the drying mechanism 224 in the conveyance direction of the printing paper 5. Since the printing paper 5 easily meanders when passing through the drying mechanism 224, the occurrence of abnormal imaging data due to the positional displacement of the printing paper 5 is effectively suppressed by adopting such a configuration.

6.2.2 Fifth Modification

In the present modification, the positional displacement amount (the magnitude of displacement from the ideal position of the printing paper 5 in the paper width direction) is calculated based on the edge position (the position of one end of the printing paper 5 in the paper width direction)

detected by the edge detection sensor 61. In order to realize this, information of the edge position when the printing paper 5 is at an ideal position is held in advance. Furthermore, as in the fourth modification, information on the current position of the colorimeter 64 is also held.

Under the above assumption, the edge position is specified based on the edge detection signal obtained during the printing processing. Then, a positional displacement amount is calculated based on the specified edge position and information of the edge position held in advance, and the position of the colorimeter 64 is adjusted based on the positional displacement amount and the current position of the colorimeter 64. Note that, as in the fourth modification, also in the present modification, the color chart 53 does not need to include the positional displacement detection chart 530 as illustrated in FIG. 8, for example.

Figure 33:
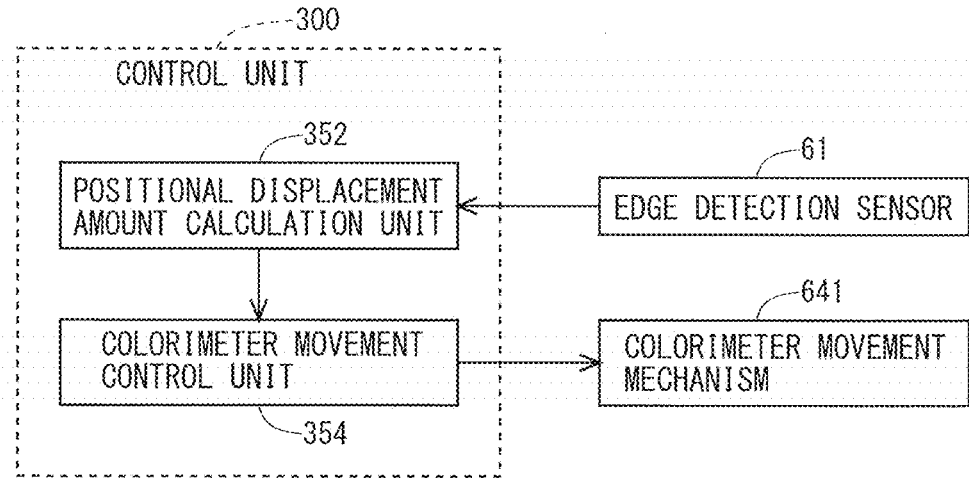
FIG. 33 is a block diagram illustrating a configuration related to position adjustment of a colorimeter in a fifth modification of the embodiment.

FIG. 33 is a block diagram illustrating a configuration related to position adjustment of the colorimeter 64 in the present modification. As described above, in the present modification, the positional displacement amount is calculated based on the edge position detected by the edge detection sensor 61. As can be grasped from FIG. 33, the position of the colorimeter 64 is adjusted by the edge detection sensor 61, the positional displacement amount calculation unit 352, the colorimeter movement control unit 354, and the colorimeter movement mechanism 641.

In the present modification, position adjustment of the colorimeter 64 is performed as follows. First, during conveyance of the printing paper 5, the edge position described above is detected by the edge detection sensor 61, and an edge detection signal indicating the edge position is sent to the control unit 300. The positional displacement amount calculation unit 352 calculates the positional displacement amount based on the edge detection signal during the conveyance of the printing paper 5. Based on the positional displacement amount calculated by the positional displacement amount calculation unit 352 and the current position of the colorimeter 64, the colorimeter movement control unit 354 controls the operation of the colorimeter movement mechanism 641 during conveyance of the printing paper 5. As a result, the colorimeter 64 moves so that the colorimeter 64 correctly performs the colorimetry of the color chart 53.

<6.3 Modification Regarding Target of Position Adjustment (Sixth Modification)>

In the above embodiment, when the positional displacement of the printing paper 5 occurs, the position of the colorimeter 64 is moved so that the colorimetry of the color chart 53 recorded on the printing paper 5 is correctly performed. However, the present invention is not limited thereto, and the recording position (printing position) of the color chart 53 on the printing paper 5 may be adjusted as in the present modification.

Figure 34:
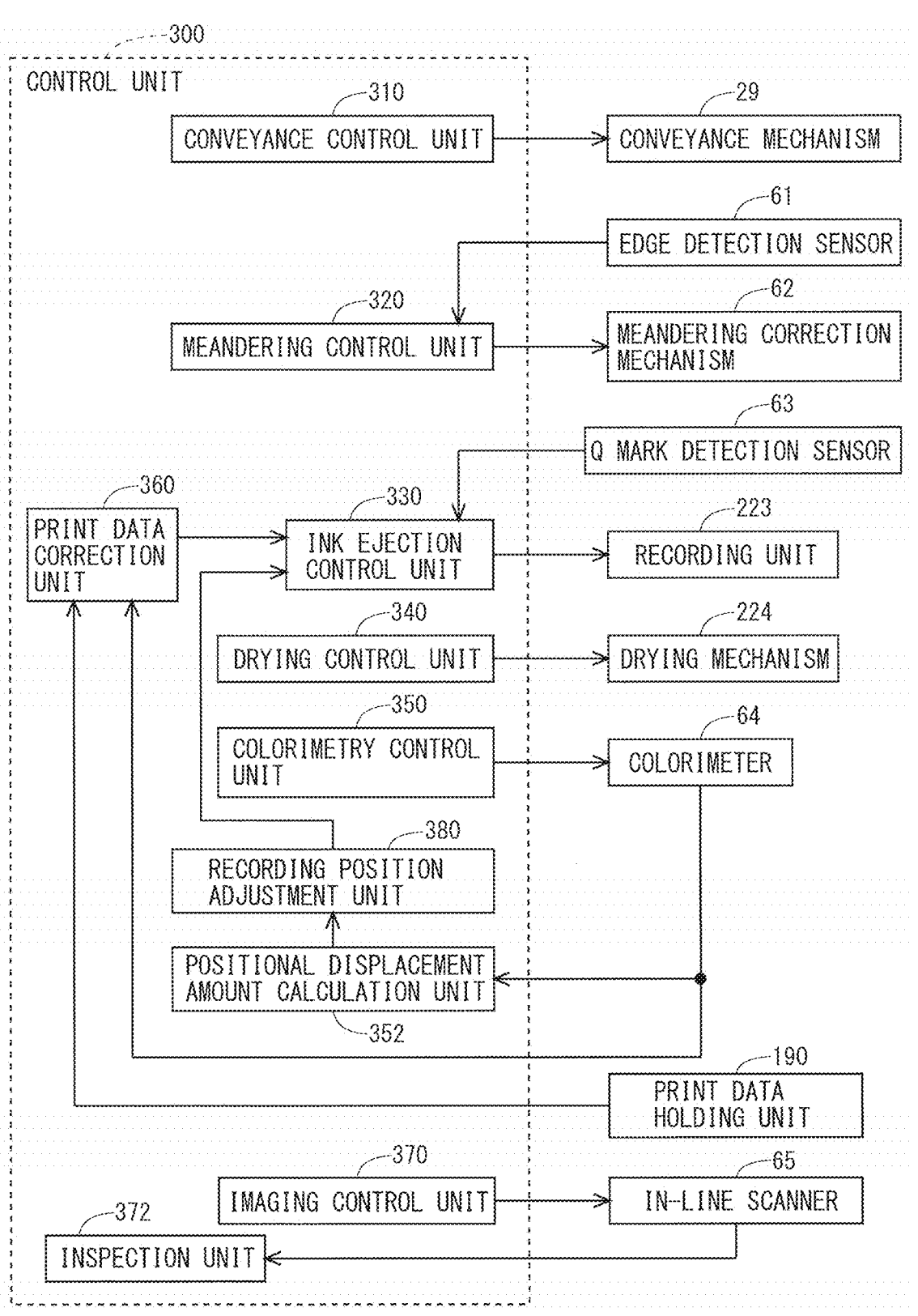
FIG. 34 is a block diagram illustrating a functional configuration of a control unit realized by executing a print control program in the print control device in a sixth modification of the embodiment.

FIG. 34 is a block diagram illustrating a functional configuration of the control unit 300 realized by the print control device 100 executing the print control program 18 in the present modification. In the present modification, a recording position adjustment unit 380 is provided instead of the colorimeter movement control unit 354 and the colorimeter movement mechanism 641 in the above embodiment (see FIG. 6). The recording position adjustment unit 380 controls the operation of the ink ejection control unit 330 so that the color chart 53 is recorded at a position suitable for color measurement by the colorimeter 64, based on the positional displacement amount calculated by the positional displacement amount calculation unit 352. As a result, the color chart 53 is recorded on the printing paper 5 by the recording unit 223 so that color measurement by the colorimeter 64 is correctly performed. In this manner, in the present modification, in step S50 of FIG. 20, the recording position of the color chart 53, in the paper width direction, at the time of being recorded on the printing paper 5 next is adjusted based on the positional displacement amount calculated by the positional displacement amount calculation unit 352 during the conveyance of the printing paper 5. Note that, in the present modification, a position adjustment means is realized by the recording position adjustment unit 380 and the ink ejection control unit 330.

<6.4 Modification Regarding Configuration of Printing Machine Body (Seventh Modification)>

Figure 35:
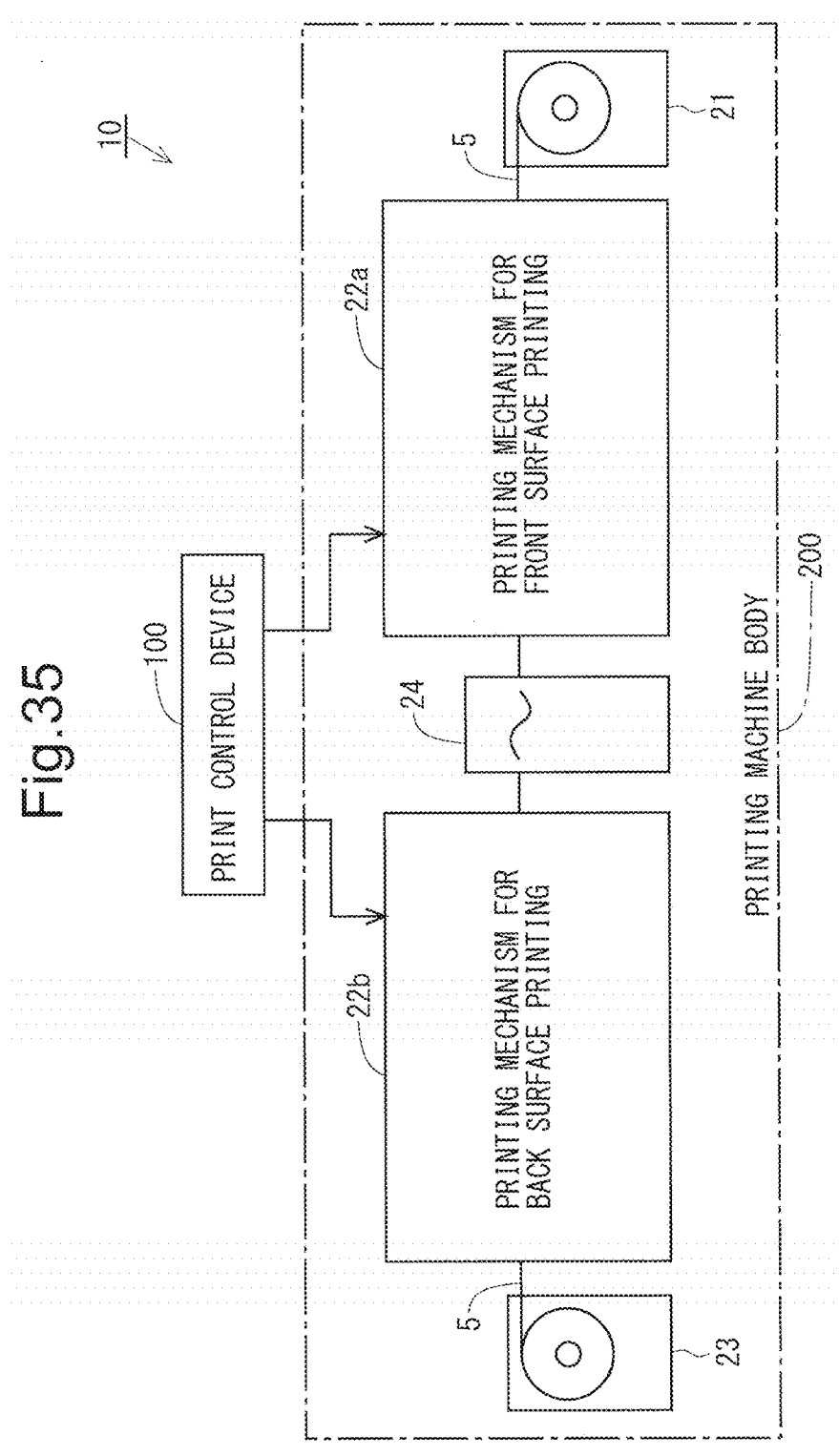
FIG. 35 is a diagram for explaining a configuration of an inkjet printing apparatus in a seventh modification of the embodiment.
Figure 36:
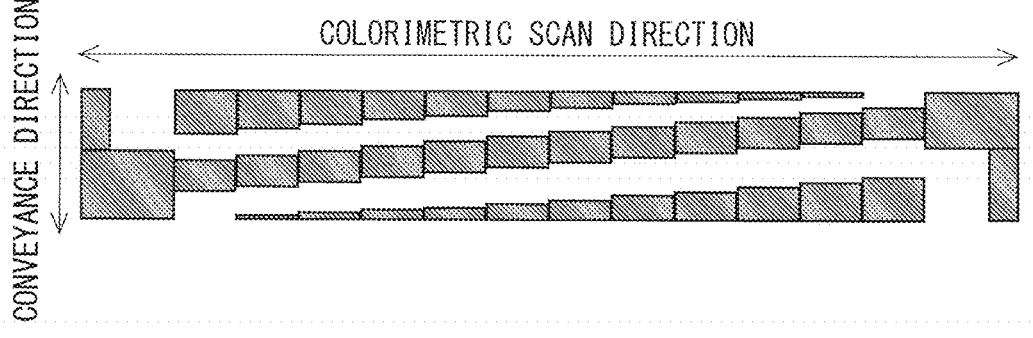
FIG. 36 is a conveyance confirmation chart disclosed in Japanese Laid-Open Patent Publication No. 2013-111777.

FIG. 35 is a drawing for explaining a configuration of an inkjet printing apparatus 10 according to the present modification. While the inkjet printing apparatus 10 according to the above embodiment is capable of single-sided printing, the inkjet printing apparatus 10 according to the present modification is capable of double-sided printing. As illustrated in FIG. 35, the printing machine body 200 of the inkjet printing apparatus 10 in the present modification includes the paper feeding unit 21, the printing mechanism 22a for front surface printing, the reversing unit 24 that reverses the front surface and the back surface of the printing paper 5, the printing mechanism 22b for back surface printing, and the paper winding unit 23. The internal configuration of the printing mechanism 22a for front surface printing and the internal configuration of the printing mechanism 22b for back surface printing are similar to the internal configuration of the printing mechanism 22 in the above embodiment.

In the present modification, when the above-described positional displacement occurs inside the printing mechanism 22a for front surface printing, the position of the colorimeter 64 is adjusted inside the printing mechanism 22a for front surface printing by the same method as the above-described embodiment, and when the above-described positional displacement occurs inside the printing mechanism 22b for back surface printing, the position of the colorimeter 64 is adjusted inside the printing mechanism 22b for back surface printing by the same method as the above-described embodiment. In this manner, with respect to the inkjet printing apparatus 10 that performs double-sided printing, it is possible to maintain a favorable positional relationship with respect to the positional relationship between the color chart 53 and the colorimeter 64 even if a large amount of printing is performed, while securing a region having a sufficient size for an image based on an actual print job.

7. OTHERS

The present invention is not limited to the above embodiment (including the modifications), and various modifications can be made without departing from the gist of the present invention. For example, although the configuration of the inkjet printing apparatus 10 using aqueous ink has been exemplified in the above embodiment, the present invention can also be applied to a case where an inkjet printing apparatus using UV ink (ultraviolet curing ink) is adopted like, for example, an inkjet printing apparatus for label printing. In this case, an ultraviolet irradiation mechanism for curing the UV ink on the printing paper 5 by ultraviolet irradiation is provided inside the printing mechanism 22 (see FIG. 2) instead of the drying mechanism 224.

Note that this application claims priority to Japanese Patent Application No. 2023-050871 titled "PRINTING APPARATUS, POSITION ADJUSTMENT METHOD, AND POSITION ADJUSTMENT PROGRAM" filed on Mar. 28, 2023, the content of which is incorporated herein by reference.

8. APPENDIX

The following configurations are also conceivable from the above disclosure.

A printing apparatus comprising:

a conveyance mechanism configured to convey a print medium having a long size in a first direction;

an ink ejection head that includes a plurality of ink ejection nozzles arranged in a second direction orthogonal to the first direction, and is configured to eject ink from the plurality of ink ejection nozzles toward the print medium conveyed by the conveyance mechanism;

a colorimeter located downstream of the ink ejection head in the first direction and configured to perform colorimetry of the color chart recorded on the print medium by ejecting ink from the ink ejection head, the color chart including a plurality of patches arranged side by side in the first direction;

a print data correction unit configured to correct print data based on colorimetric data obtained by the colorimeter performing colorimetry of the color chart;

an ink ejection control unit configured to control ejection of ink from the ink ejection head based on the print data corrected by the print data correction unit;

a positional displacement amount calculation unit configured to, during conveyance of the print medium by the conveyance mechanism, calculate a positional displacement amount indicating a magnitude of positional displacement of the print medium in the second direction based on the colorimetric data; and a position adjustment means for, during conveyance of the print medium by the conveyance mechanism, based on the positional displacement amount, adjusting a position of the colorimeter in the second direction or a recording position of the color chart, in the second direction, at the time of being recorded next on the print medium, wherein the color chart includes:

a first positional displacement detection patch in which only a region that is on one end side in the second direction and is outside a colorimetric range of the colorimeter when a positional relationship between the colorimeter and the color chart is an ideal positional relationship is painted with a predetermined color, and a second positional displacement detection patch in which only a region that is on another end side in the second direction and is outside a colorimetric range of the colorimeter when a positional relationship between the colorimeter and the color chart is an ideal positional relationship is painted with a predetermined color; or a positional displacement detection patch in which only a region that is on one end side in the second direction and is outside a colorimetric range of the colorimeter when a positional relationship between the colorimeter and the color chart is an ideal positional relationship is painted with a first predetermined color, and only a region that is on another end side in the second direction and is outside a colorimetric range of the colorimeter when a positional relationship between the colorimeter and the color chart is an ideal positional relationship is painted with a second predetermined color.

A position adjustment method for, in a printing apparatus, adjusting a positional relationship between a colorimeter and a color chart, the printing apparatus including a conveyance mechanism configured to convey a print medium having a long size in a first direction, an ink ejection head that includes a plurality of ink ejection nozzles arranged in a second direction orthogonal to the first direction and is configured to eject ink from the plurality of ink ejection nozzles toward the print medium conveyed by the conveyance mechanism, the colorimeter located downstream of the ink ejection head in the first direction and configured to perform colorimetry of the color chart recorded on the print medium by ejecting ink from the ink ejection head, a print data correction unit configured to correct print data based on colorimetric data obtained by the colorimeter performing colorimetry of the color chart, and an ink ejection control unit configured to control ejection of ink from the ink ejection head based on the print data corrected by the print data correction unit, the color chart including a plurality of patches arranged side by side in the first direction, the position adjustment method comprising:

a color chart record step of recording the color chart on the print medium by ejecting ink from the ink ejection head;

a color chart colorimetry step of performing, by the colorimeter, colorimetry of the color chart recorded on the print medium;

a positional displacement amount calculation step of, during conveyance of the print medium by the conveyance mechanism, calculating a positional displacement amount indicating a magnitude of positional displacement of the print medium in the second direction based on the colorimetric data obtained in the color chart colorimetry step; and a position adjustment step of, during conveyance of the print medium by the conveyance mechanism, based on the positional displacement amount, adjusting a position of the colorimeter in the second direction or a recording position of the color chart, in the second direction, at the time of being recorded next on the print medium, wherein the color chart includes:

a first positional displacement detection patch in which only a region that is on one end side in the second direction and is outside a colorimetric range of the colorimeter when a positional relationship between the colorimeter and the color chart is an ideal positional relationship is painted with a predetermined color, and a second positional displacement detection patch in which only a region that is on another end side in the second direction and is outside a colorimetric range of the colorimeter when a positional relationship between the colorimeter and the color chart is an ideal positional relationship is painted with a predetermined color; or a positional displacement detection patch in which only a region that is on one end side in the second direction and is outside a colorimetric range of the colorimeter when a positional relationship between the colorimeter and the color chart is an ideal positional relationship is painted with a first predetermined color, and only a region that is on another end side in the second direction and is outside a colorimetric range of the colorimeter when a positional relationship between the colorimeter and the color chart is an ideal positional relationship is painted with a second predetermined color.

A non-transitory computer-readable recording medium that records a position adjustment program for, in a printing apparatus, adjusting a positional relationship between a colorimeter and a color chart, the printing apparatus including a conveyance mechanism configured to convey a print medium having a long size in a first direction, an ink ejection head that includes a plurality of ink ejection nozzles arranged in a second direction orthogonal to the first direction and is configured to eject ink from the plurality of ink ejection nozzles toward the print medium conveyed by the conveyance mechanism, the colorimeter located downstream of the ink ejection head in the first direction and configured to perform colorimetry of a color chart recorded on the print medium by ejecting ink from the ink ejection head, a print data correction unit configured to correct print data based on colorimetric data obtained by the colorimeter performing colorimetry of the color chart, and an ink ejection control unit configured to control ejection of ink from the ink ejection head based on the print data corrected by the print data correction unit, the color chart including a plurality of patches arranged side by side in the first direction, wherein the color chart includes:

a first positional displacement detection patch in which only a region that is on one end side in the second direction and is outside a colorimetric range of the colorimeter when a positional relationship between the colorimeter and the color chart is an ideal positional relationship is painted with a predetermined color, and a second positional displacement detection patch in which only a region that is on another end side in the second direction and is outside a colorimetric range of the colorimeter when a positional relationship between the colorimeter and the color chart is an ideal positional relationship is painted with a predetermined color; or a positional displacement detection patch in which only a region that is on one end side in the second direction and is outside a colorimetric range of the colorimeter when a positional relationship between the colorimeter and the color chart is an ideal positional relationship is painted with a first predetermined color, and only a region that is on another end side in the second direction and is outside a colorimetric range of the colorimeter when a positional relationship between the colorimeter and the color chart is an ideal positional relationship is painted with a second predetermined color, the position adjustment program causing a computer included in the printing apparatus to execute:

a color chart record step of controlling ejection of ink from the ink ejection head so that the color chart is recorded on the print medium;

a color chart colorimetry step of causing the colorimeter to perform colorimetry of the color chart recorded on the print medium;

a positional displacement amount calculation step of, during conveyance of the print medium by the conveyance mechanism, calculating a positional displacement amount indicating a magnitude of positional displacement of the print medium in the second direction based on the colorimetric data obtained in the color chart colorimetry step; and a position adjustment step of, during conveyance of the print medium by the conveyance mechanism, based on the positional displacement amount, adjusting a position of the colorimeter in the second direction or a recording position of the color chart, in the second direction, at the time of being recorded next on the print medium.

What is claimed is:

1. A printing apparatus comprising:

a conveyance mechanism configured to convey a print medium having a long size in a first direction;

an ink ejection head that includes a plurality of ink ejection nozzles arranged in a second direction orthogonal to the first direction, and is configured to eject ink from the plurality of ink ejection nozzles toward the print medium conveyed by the conveyance mechanism;

a reader located downstream of the ink ejection head in the first direction and configured to read a color chart recorded on the print medium by ejecting ink from the ink ejection head, the color chart including a plurality of patches arranged side by side in the first direction;

a print data correction unit configured to correct print data based on read data obtained by the reader reading the color chart;

an ink ejection control unit configured to control ejection of ink from the ink ejection head based on the print data corrected by the print data correction unit;

a positional displacement amount calculation unit configured to, during conveyance of the print medium by the conveyance mechanism, calculate a positional displacement amount indicating a magnitude of positional displacement of the print medium in the second direction with respect to the reader; and a position adjustment means for, during conveyance of the print medium by the conveyance mechanism, performing position adjustment processing of, based on the positional displacement amount, adjusting a position of the reader in the second direction or a recording position of the color chart, in the second direction, at the time of being recorded next on the print medium.

2. The printing apparatus according to claim 1, wherein the reader is a colorimeter, the position adjustment means includes:

a colorimeter movement mechanism configured to move the colorimeter; and a movement mechanism control unit configured to control an operation of the colorimeter movement mechanism, and the movement mechanism control unit controls the operation of the colorimeter movement mechanism based on the positional displacement amount, so that a position of the colorimeter in the second direction is adjusted as the position adjustment processing.

3. The printing apparatus according to claim 1, wherein the reader is a colorimeter, and the positional displacement amount calculation unit calculates the positional displacement amount based on the read data.

4. The printing apparatus according to claim 3, wherein the color chart includes:

a first positional displacement detection patch in which only a region that is on one end side in the second direction and is outside a colorimetric range of the colorimeter when a positional relationship between the colorimeter and the color chart is an ideal positional relationship is painted with a predetermined color; and a second positional displacement detection patch in which only a region that is on another end side in the second direction and is outside the colorimetric range of the colorimeter when a positional relationship between the colorimeter and the color chart is an ideal positional relationship is painted with a predetermined color, and the position adjustment means performs the position adjustment processing when a colorimetric value obtained by performing colorimetry of the first positional displacement detection patch colorimetric value obtained by performing colorimetry of the second positional displacement detection patch is larger than a predetermined threshold value.

5. The printing apparatus according to claim 4, wherein the color chart further includes a reference patch entirely painted with a predetermined color, and the position adjustment means performs the position adjustment processing in consideration of a colorimetric value obtained by the colorimeter performing colorimetry of the reference patch.

6. The printing apparatus according to claim 4, wherein the color chart further includes a print medium color patch on which no ink is painted, and the position adjustment means performs the position adjustment processing in consideration of a difference between a colorimetric value obtained by the colorimeter performing colorimetry of the print medium color patch and a colorimetric value obtained by the colorimeter performing colorimetry of the first positional displacement detection patch, and a difference between a colorimetric value obtained by the colorimeter performing colorimetry of the print medium color patch and a colorimetric value obtained by the colorimeter performing colorimetry of the second positional displacement detection patch.

7. The printing apparatus according to claim 3, wherein the color chart includes a positional displacement detection patch in which only a region that is on one end side in the second direction and is outside a colorimetric range of the colorimeter when a positional relationship between the colorimeter and the color chart is an ideal positional relationship is painted with a first predetermined color, and only a region that is on another end side in the second direction and is outside the colorimetric range of the colorimeter when a positional relationship between the colorimeter and the color chart is an ideal positional relationship is painted with a second predetermined color, and the position adjustment means performs the position adjustment processing when a colorimetric value for the first predetermined color obtained by performing colorimetry of the positional displacement detection or patch a colorimetric value for the second predetermined color obtained by performing colorimetry of the positional displacement detection patch is larger than a predetermined threshold value.

8. The printing apparatus according to claim 3, wherein the color chart includes:

a first one end side positional displacement detection patch in which only a region that is a region of a first size on one end side in the second direction and is outside a colorimetric range of the colorimeter when a positional relationship between the colorimeter and the color chart is an ideal positional relationship is painted with a predetermined color;

a second one end side positional displacement detection patch in which only a region that is a region of a second size smaller than the first size on one end side in the second direction and is outside a colorimetric range of the colorimeter when a positional relationship between the colorimeter and the color chart is in an ideal positional relationship is painted with a predetermined color;

a first other end side positional displacement detection patch in which only a region that is a region of the first size on another end side in the second direction and is outside a colorimetric range of the colorimeter when a positional relationship between the colorimeter and the color chart is an ideal positional relationship is painted with a predetermined color; and a second other end side positional displacement detection patch in which only a region that is a region of the second size on another end side in the second direction and is outside a colorimetric range of the colorimeter when a positional relationship between the colorimeter and the color chart is an ideal positional relationship is painted with a predetermined color, the position adjustment means performs the position adjustment processing when any one of a color included in the first one end side positional displacement detection patch, a color included in the second one end side positional displacement detection patch, a color included in the first other end side positional displacement detection patch, and a color included in the second other end side positional displacement detection patch is detected by the colorimeter, and when the color included in the second one end side positional displacement detection patch or the color included in the second other end side positional displacement detection patch is detected by the colorimeter, the read data obtained after a most recent time point at which both the color included in the second one end side positional displacement detection patch and the color included in the second other end side positional displacement detection patch are not detected is treated as invalid data.

9. The printing apparatus according to claim 3, wherein the color chart includes:

a first both end side positional displacement detection patch in which only a region that is a region of a first size on one end side in the second direction and is outside a colorimetric range of the colorimeter when a positional relationship between the colorimeter and the color chart is an ideal positional relationship is painted with a first predetermined color, and only a region that is a region of the first size on another end side in the second direction and is outside a colorimetric range of the colorimeter when a positional relationship between the colorimeter and the color chart is an ideal positional relationship is painted with a second predetermined color; and a second both end side positional displacement detection patch in which only a region that is a region of a second size smaller than the first size on one end side in the second direction and is outside a colorimetric range of the colorimeter when a positional relationship between the colorimeter and the color chart is an ideal positional relationship is painted with the first predetermined color, and only a region that is a region of the second size on another end side in the second direction and is outside a colorimetric range of the colorimeter when a positional relationship between the colorimeter and the color chart is an ideal positional relationship is painted with the second predetermined color, the position adjustment means performs the position adjustment processing when any one of the first predetermined color included in the first both end side positional displacement detection patch, the second predetermined color included in the first both end side positional displacement detection patch, the first predetermined color included in the second both end side positional displacement detection patch, and the second predetermined color included in the second both end side positional displacement detection patch is detected by the colorimeter, and when the colorimeter detects the first predetermined color included in the second both end side positional displacement detection patch or the second predetermined color included in the second both end side positional displacement detection patch, the read data obtained after a most recent time point at which both the first predetermined color included in the second both end side positional displacement detection patch and the second predetermined color included in the second both end side positional displacement detection patch are not detected is treated as invalid data.

10. The printing apparatus according to claim 3, further comprising a drying mechanism configured to dry the print medium after ink is ejected from the ink ejection head to the print medium, wherein the colorimeter is provided downstream of the drying mechanism in a conveyance direction of the print medium.

11. The printing apparatus according to claim 1, further comprising an imaging device configured to capture an image recorded on the print medium by ejecting ink from the ink ejection head, wherein the positional displacement amount calculation unit calculates the positional displacement amount based on imaging data obtained by the imaging device capturing an image of the color chart.

12. The printing apparatus according to claim 11, further comprising a drying mechanism configured to dry the print medium after ink is ejected from the ink ejection head to the print medium, wherein the imaging device is provided downstream of the drying mechanism in a conveyance direction of the print medium.

13. The printing apparatus according to claim 1, further comprising an end detection sensor configured to detect a position of an end, in the second direction, of the print medium conveyed by the conveyance mechanism, wherein the positional displacement amount calculation unit calculates the positional displacement amount based on the position detected by the end detection sensor.

14. The printing apparatus according to claim 1, wherein, when the positional displacement amount calculated by the positional displacement amount calculation unit exceeds a predetermined threshold value, the read data obtained after a most recent time point at which the positional displacement amount less than or equal to the threshold value is detected is treated as invalid data.

15. A position adjustment method for, in a printing apparatus, adjusting a positional relationship between a reader and a color chart, the printing apparatus including a conveyance mechanism configured to convey a print medium having a long size in a first direction, an ink ejection head that includes a plurality of ink ejection nozzles arranged in a second direction orthogonal to the first direction and is configured to eject ink from the plurality of ink ejection nozzles toward the print medium conveyed by the conveyance mechanism, the reader located downstream of the ink ejection head in the first direction and configured to read an image recorded on the print medium by ejecting ink from the ink ejection head, a print data correction unit configured to correct print data based on read data obtained by the reader reading the color chart including a plurality of patches arranged side by side in the first direction, and an ink ejection control unit configured to control ejection of ink from the ink ejection head based on the print data corrected by the print data correction unit, the position adjustment method comprising:

a color chart record step of recording the color chart on the print medium by ejecting ink from the ink ejection head;

a color chart read step of reading, by the reader, the color chart recorded on the print medium;

a positional displacement amount calculation step of, during conveyance of the print medium by the conveyance mechanism, calculating a positional displacement amount indicating a magnitude of positional displacement of the print medium in the second direction with respect to the reader; and a position adjustment step of, during conveyance of the print medium by the conveyance mechanism, based on the positional displacement amount, adjusting a position of the reader in the second direction or a recording position of the color chart, in the second direction, at the time of being recorded next on the print medium.

16. The position adjustment method according to claim 15, wherein the printing apparatus further includes an imaging device that is configured to capture an image recorded on the print medium by ejecting ink from the ink ejection head, and is capable of capturing an image of an entire range of the print medium in the second direction, and the reader is a colorimeter, the position adjustment method further comprising:

a print medium replacement step of replacing the print medium;

a position adjustment chart record step of recording a position adjustment chart on the print medium by ejecting ink from the ink ejection head;

a position adjustment chart imaging step of capturing, by the imaging device, an image of the position adjustment chart;

an initial position determination step of determining a position where the colorimeter is to be disposed based on imaging data obtained in the position adjustment chart imaging step; and a colorimeter movement step of moving the colorimeter to the position determined in the initial position determination step, wherein in the printing apparatus, when the print medium replacement step is executed, before the color chart record step, the color chart read step, the positional displacement amount calculation step, and the position adjustment step are executed, the position adjustment chart record step, the position adjustment chart imaging step, the initial position determination step, and the colorimeter movement step are executed in this order.

17. A non-transitory computer-readable recording medium that records a position adjustment program for, in a printing apparatus, adjusting a positional relationship between a reader and a color chart, the printing apparatus including a conveyance mechanism configured to convey a print medium having a long size in a first direction, an ink ejection head that includes a plurality of ink ejection nozzles arranged in a second direction orthogonal to the first direction and is configured to eject ink from the plurality of ink ejection nozzles toward the print medium conveyed by the conveyance mechanism, the reader located downstream of the ink ejection head in the first direction and configured to read an image recorded on the print medium by ejecting ink from the ink ejection head, a print data correction unit configured to correct print data based on read data obtained by the reader reading the color chart including a plurality of patches arranged side by side in the first direction, and an ink ejection control unit configured to control ejection of ink from the ink ejection head based on the print data corrected by the print data correction unit, the position adjustment program causing a computer included in the printing apparatus to execute:

a color chart record step of controlling ejection of ink from the ink ejection head so that the color chart is recorded on the print medium;

a color chart read step of causing the reader to read the color chart recorded on the print medium;

a positional displacement amount calculation step of, during conveyance of the print medium by the conveyance mechanism, calculating a positional displacement amount indicating a magnitude of positional displacement of the print medium in the second direction with respect to the reader; and a position adjustment step of, during conveyance of the print medium by the conveyance mechanism, based on the positional displacement amount, adjusting a position of the reader in the second direction or a recording position of the color chart, in the second direction, at the time of being recorded next on the print medium.

\* \* \* \* \*